United States Patent
Giri et al.

(10) Patent No.: US 10,686,181 B2
(45) Date of Patent: Jun. 16, 2020

(54) ISOLATED CELL DESIGN IN ELECTRO-OPTIC DEVICES

(71) Applicant: Gentex Corporation, Zeeland, MI (US)

(72) Inventors: Punam Giri, Holland, MI (US); Leroy J. Kloeppner, Jenison, MI (US)

(73) Assignee: GENTEX CORPORATION, Zeeland, MI (US)

( * ) Notice: Subject to any disclaimer, the term of this patent is extended or adjusted under 35 U.S.C. 154(b) by 283 days.

(21) Appl. No.: 15/786,335

(22) Filed: Oct. 17, 2017

(65) Prior Publication Data
US 2019/0115583 A1    Apr. 18, 2019

(51) Int. Cl.
*H01M 4/06*    (2006.01)
*H01M 4/66*    (2006.01)
(Continued)

(52) U.S. Cl.
CPC .............. *H01M 4/06* (2013.01); *C09K 9/02* (2013.01); *G02F 1/15* (2013.01); *H01M 4/661* (2013.01); *H01M 6/14* (2013.01)

(58) Field of Classification Search
CPC .......... H01M 4/06; H01M 4/661; H01M 6/14; C09K 9/02; G02F 1/15
See application file for complete search history.

(56) References Cited

U.S. PATENT DOCUMENTS 4,297,401 A    10/1981    Chern et al.
4,418,102 A    11/1983    Ferrato
(Continued)

FOREIGN PATENT DOCUMENTS

EP    2426552    3/2012
EP    1700151    1/2014
(Continued)

OTHER PUBLICATIONS

International Search Report re Application No. PCT/US2018/056056; 6pgs.

*Primary Examiner* — Wen Huang
(74) *Attorney, Agent, or Firm* — Foley & Lardner LLP; Bradley D. Johnson

(57) ABSTRACT

An electro-optic device includes a first substrate having a first surface and a second surface, the first and second surfaces are substantially parallel to one another; a second substrate having a third surface and a fourth surface, the third and fourth surfaces are substantially parallel to one another; a sealing member; and an electrochromic medium; wherein the first and second substrates are substantially parallel to one another; the sealing member is positioned between the first substrate and second substrate to define a chamber containing the electrochromic medium; the second surface and the third surface are proximate to one another; the second surface includes a conductive layer; the third surface includes an optional second conductive layer; an active cathode region is present in one or more of the first conductive layer and the optional second conductive layer; an active anode region is present in one or more of the first conductive layer and the optional second conductive layer; and (1) the active anode region is at least partially not occluded by the active cathode region when the chamber is viewed from any vantage point perpendicular to the second surface; or (2) the active cathode region is at least partially not occluded by the active anode region when the chamber is viewed from any vantage point perpendicular to the second surface.

9 Claims, 15 Drawing Sheets

(51) Int. Cl.
*C09K 9/02* (2006.01)
*G02F 1/15* (2019.01)
*H01M 6/14* (2006.01)

(56) References Cited

U.S. PATENT DOCUMENTS

| | | |
|---|---|---|
| 4,695,490 A | 9/1987 | McClelland et al. |
| 4,902,108 A | 2/1990 | Byker |
| 5,596,023 A | 1/1997 | Tsubota et al. |
| 5,596,024 A | 1/1997 | Horie et al. |
| 5,928,572 A | 7/1999 | Tonar et al. |
| 6,157,480 A | 12/2000 | Anderson et al. |
| 6,188,505 B1 | 2/2001 | Lomprey et al. |
| 6,445,486 B1 | 9/2002 | Lomprey et al. |
| 6,710,906 B2 | 3/2004 | Guarr et al. |
| 6,714,334 B2 | 3/2004 | Tonar |
| 7,046,418 B2 | 5/2006 | Lin et al. |
| 7,372,611 B2 | 5/2008 | Tonar et al. |
| 7,428,091 B2 | 9/2008 | Baumann et al. |
| 7,835,059 B2 | 11/2010 | Giri et al. |
| 7,855,821 B2 | 12/2010 | Baumann et al. |
| 8,274,729 B2 | 9/2012 | Luten et al. |
| 2002/0141032 A1 | 10/2002 | Guarr et al. |
| 2015/0346573 A1 | 12/2015 | Theiste et al. |
| 2016/0077399 A1 | 3/2016 | Tonar et al. |

FOREIGN PATENT DOCUMENTS

| | | |
|---|---|---|
| WO | WO-98/42796 A1 | 10/1998 |
| WO | WO-99/02621 | 1/1999 |

(a)             (b)             (c)

Less than 1 min to switch (a)　　　(b)　　　(c)　　　(d)　　　(e)

ISOLATED CELL DESIGN IN ELECTRO-OPTIC DEVICES

BACKGROUND

The present invention relates generally to the field of electro-optic devices and apparatuses incorporating these devices. More particularly, the technology relates to an isolated electrode cell design in these devices.

SUMMARY

Provided herein, in one aspect, are electro-optic devices containing a first substrate having a first surface and a second surface; a second substrate having a third surface and a fourth surface; a sealing member; and an electrochromic medium; wherein the second and third surfaces are substantially parallel to one another; the sealing member is positioned between the first substrate and second substrate to define a chamber containing the electrochromic medium; the second surface and the third surface are proximate to one another; the second surface includes a conductive layer; the third surface includes a second conductive layer; an active cathode region is present in one or more of the first conductive layer and the second conductive layer; an active anode region is present in one or more of the first conductive layer and the second conductive layer; and (1) the active anode region is at least partially not occluded by the active cathode region when the chamber is viewed from any vantage point perpendicular to the second surface; or (2) the active cathode region is at least partially not occluded by the active anode region when the chamber is viewed from any vantage point perpendicular to the second surface. In some embodiments, a non-active region is present in one or more of the first conductive layer and the second conductive layer, the non-active region being unable to reduce or oxidize electroactive material in the electrochromic medium. In some embodiments, the active anode region is at least partially occluded by the non-active region when the chamber is viewed from any vantage point perpendicular to the second surface. In some embodiments, the active cathode region is at least partially occluded by the non-active region when the chamber is viewed from any vantage point perpendicular to the second surface. In some embodiments, the first substrate is offset with respect to the second substrate. In some embodiments, the electrochromic medium comprises at least one cathodic electroactive material and at least one anodic electroactive material. In some embodiments, at least one of the cathodic electroactive material and the anodic electroactive material is electrochromic. In some embodiments, a portion of the active cathode region is not occluded by the active anode region when the chamber is viewed from any vantage point perpendicular to the second surface. In some embodiments, a portion of the active anode region is not occluded by the active cathode region when the chamber is viewed from any vantage point perpendicular to the second surface. In some embodiments, the active anode region is not occluded by the active cathode region when the chamber is viewed from any vantage point perpendicular to the second surface. In some embodiments, the device is an optical imager or filter that blocks a range of wavelengths through a functional zone of the device. In some embodiments, the device is an aircraft transparency; architectural window; mirror; or light filter for a photographic device or sensor. In some embodiments, the electrochromic medium comprises a cathodic material and an anodic material; the cathodic material and the anodic material are electrochromic; and at least one of the cathodic material and the anodic material, upon reduction or oxidation, respectively, lacks a significant absorbance in the visible spectrum. In some embodiments, the first and second surfaces are substantially parallel to one another. In some embodiments, the third and fourth surfaces are substantially parallel to one another.

Provided herein, in another aspect, are electro-optic devices containing a first substrate having a first surface and a second surface, the first and second surfaces are substantially parallel to one another; a second substrate having a third surface and a fourth surface, the third and fourth surfaces are substantially parallel to one another; a sealing member; and an electrochromic medium; wherein the first and second substrates are substantially parallel to one another; the sealing member is positioned between the first substrate and second substrate to define a chamber containing the electrochromic medium; the second surface and the third surface are proximate to one another; the second surface includes a conductive layer; the third surface includes a second conductive layer; an active cathode region is present in one or more of the first conductive layer and the second conductive layer; an active anode region is present in one or more of the first conductive layer and the second conductive layer; and (1) the active anode region is at least partially not occluded by the active cathode region when the chamber is viewed from any vantage point perpendicular to the second surface; or (2) the active cathode region is at least partially not occluded by the active anode region when the chamber is viewed from any vantage point perpendicular to the second surface. In some embodiments, a non-active region is present in one or more of the first conductive layer and the second conductive layer, the non-active region being unable to reduce or oxidize electroactive material in the electrochromic medium. In some embodiments, the active anode region is at least partially occluded by the non-active region when the chamber is viewed from any vantage point perpendicular to the second surface. In some embodiments, the active cathode region is at least partially occluded by the non-active region when the chamber is viewed from any vantage point perpendicular to the second surface. In some embodiments, the first substrate is offset with respect to the second substrate. In some embodiments, the electrochromic medium comprises at least one cathodic electroactive material and at least one anodic electroactive material. In some embodiments, at least one of the cathodic electroactive material and the anodic electroactive material is electrochromic. In some embodiments, a portion of the active cathode region is not occluded by the active anode region when the chamber is viewed from any vantage point perpendicular to the second surface. In some embodiments, a portion of the active anode region is not occluded by the active cathode region when the chamber is viewed from any vantage point perpendicular to the second surface. In some embodiments, the active anode region is not occluded by the active cathode region when the chamber is viewed from any vantage point perpendicular to the second surface. In some embodiments, the device is an optical imager or filter that blocks a range of wavelengths through a functional zone of the device. In some embodiments, the device is an aircraft transparency; architectural window; mirror; or light filter for a photographic device or sensor. In some embodiments, the electrochromic medium comprises a cathodic material and an anodic material; the cathodic material and the anodic material are electrochromic; and at least one of the cathodic material and the anodic material, upon reduction or oxidation, respectively, lacks a significant absorbance in the visible spectrum.

Provided herein, in another aspect, are electro-optic devices containing a first substrate having a first surface and a second surface, the first and second surfaces are substantially parallel to one another; a second substrate having a third surface and a fourth surface, the third and fourth surfaces are substantially parallel to one another; a sealing member; and an electrochromic medium; wherein the first and second substrates are substantially parallel to one another; the sealing member is positioned between the first substrate and second substrate to define a chamber containing the electrochromic medium; the second surface and the third surface are proximate to one another; the second surface includes a conductive layer; an active cathode region and an active anode region are present in the conductive layer. In some embodiments, the active anode region is at least partially not occluded by the active cathode region when the chamber is viewed from any vantage point perpendicular to the second surface, or the active cathode region is at least partially not occluded by the active anode region when the chamber is viewed from any vantage point perpendicular to the second surface. In some embodiments, a non-active region is present in the conductive layer, the non-active region being unable to reduce or oxidize electroactive material in the electrochromic medium. In some embodiments, the first substrate is offset with respect to the second substrate. In some embodiments, the electrochromic medium comprises at least one cathodic electroactive material and at least one anodic electroactive material. In some embodiments, at least one of the cathodic electroactive material and the anodic electroactive material is electrochromic. In some embodiments, the device is an optical imager or filter that blocks a range of wavelengths through a functional zone of the device. In some embodiments, the device is an aircraft transparency; architectural window; mirror; or light filter for a photographic device or sensor. In some embodiments, the electrochromic medium comprises a cathodic material and an anodic material; the cathodic material and the anodic material are electrochromic; and at least one of the cathodic material and the anodic material, upon reduction or oxidation, respectively, lacks a significant absorbance in the visible spectrum.

Provided herein, in another aspect, are electro-optic cells containing a first substrate having a first surface and a second surface, the first and second surfaces are substantially parallel to one another; a second substrate having a third surface and a fourth surface, the third and fourth surfaces are substantially parallel to one another; a sealing member; and an electrochromic medium; wherein the first and second substrates are substantially parallel to one another; the sealing member is positioned between the first substrate and second substrate to define a chamber containing the electrochromic medium; the second surface and the third surface are proximate to one another; the second surface includes a conductive layer; the third surface includes a second conductive layer; an active cathode region is present in one or more of the first conductive layer and the second conductive layer; an active anode region is present in one or more of the first conductive layer and the second conductive layer; and (1) the active anode region is at least partially not occluded by the active cathode region when the chamber is viewed from any vantage point perpendicular to the second surface; or (2) the active cathode region is at least partially not occluded by the active anode region when the chamber is viewed from any vantage point perpendicular to the second surface. In some embodiments, a non-active region is present in one or more of the first conductive layer and the second conductive layer, the non-active region being unable to reduce or oxidize electroactive material in the electrochromic medium. In some embodiments, the active anode region is at least partially occluded by the non-active region when the chamber is viewed from any vantage point perpendicular to the second surface. In some embodiments, the active cathode region is at least partially occluded by the non-active region when the chamber is viewed from any vantage point perpendicular to the second surface. In some embodiments, the first substrate is offset with respect to the second substrate. In some embodiments, the electrochromic medium comprises at least one cathodic electroactive material and at least one anodic electroactive material. In some embodiments, at least one of the cathodic electroactive material and the anodic electroactive material is electrochromic. In some embodiments, a portion of the active cathode region is not occluded by the active anode region when the chamber is viewed from any vantage point perpendicular to the second surface. In some embodiments, a portion of the active anode region is not occluded by the active cathode region when the chamber is viewed from any vantage point perpendicular to the second surface. In some embodiments, the active anode region is not occluded by the active cathode region when the chamber is viewed from any vantage point perpendicular to the second surface. In some embodiments, the electrochromic medium comprises a cathodic material and an anodic material; the cathodic material and the anodic material are electrochromic; and at least one of the cathodic material and the anodic material, upon reduction or oxidation, respectively, lacks a significant absorbance in the visible spectrum.

Provided herein, in another aspect, are electro-optic cells containing a first substrate having a first surface and a second surface, the first and second surfaces are substantially parallel to one another; a second substrate having a third surface and a fourth surface, the third and fourth surfaces are substantially parallel to one another; a sealing member; and an electrochromic medium; wherein the first and second substrates are substantially parallel to one another; the sealing member is positioned between the first substrate and second substrate to define a chamber containing the electrochromic medium; the second surface and the third surface are proximate to one another; the second surface includes a conductive layer; an active cathode region and an active anode region are present in the conductive layer; and (1) the active anode region is at least partially not occluded by the active cathode region when the chamber is viewed from any vantage point perpendicular to the second surface; or (2) the active cathode region is at least partially not occluded by the active anode region when the chamber is viewed from any vantage point perpendicular to the second surface. In some embodiments, a non-active region is present in the conductive layer, the non-active region being unable to reduce or oxidize electroactive material in the electrochromic medium. In some embodiments, the first substrate is offset with respect to the second substrate. In some embodiments, the electrochromic medium comprises at least one cathodic electroactive material and at least one anodic electroactive material. In some embodiments, at least one of the cathodic electroactive material and the anodic electroactive material is electrochromic. In some embodiments, the electrochromic medium comprises a cathodic material and an anodic material; the cathodic material and the anodic material are electrochromic; and at least one of the cathodic material and the anodic material, upon reduction or oxidation, respectively, lacks a significant absorbance in the visible spectrum.

DETAILED DESCRIPTION

Figure 1:
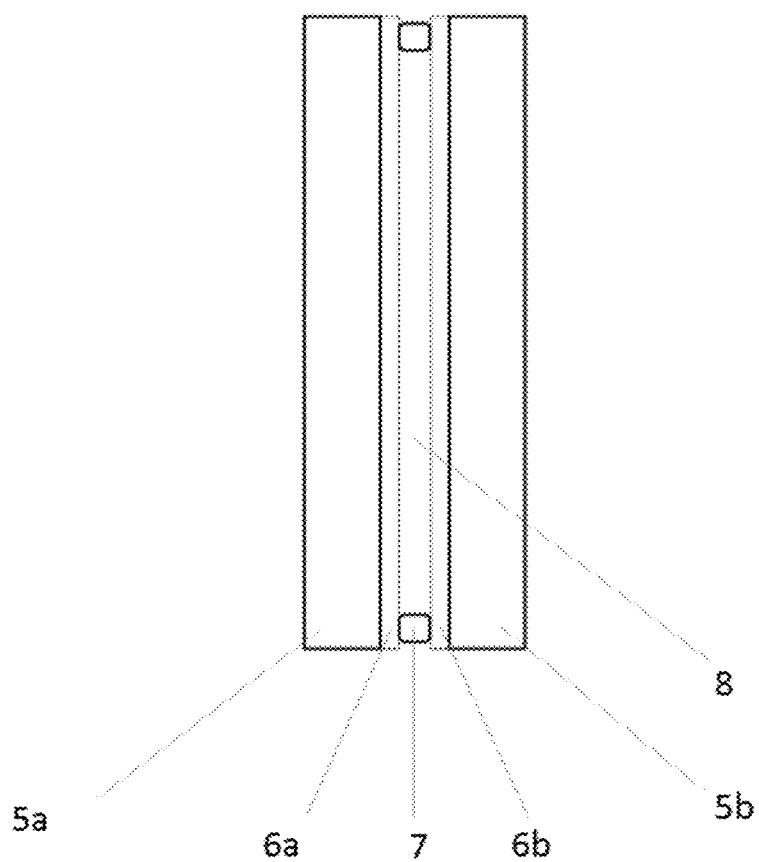
FIG. 1 is a cross-sectional schematic representation of a non-limiting example of an electro-optic cell.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like. Such substitution includes solubility enhancing groups as described in U.S. Pat. No. 6,445,486.

As used herein, $C_m$-$C_n$, such as $C_1$-$C_{12}$, $C_1$-$C_8$, or $C_1$-$C_6$ when used before a group refers to that group containing m to n carbon atoms.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

"TFSI" as used herein refers to bis(trifluoromethanesulfonyl)imide, as illustrated below:

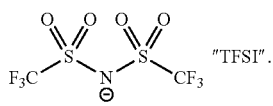

As used herein, near infra-red or "NIR" refers to light with a wavelength within the range of 700 nm to 1400 nm, inclusive of endpoints.

In one aspect, provided herein are isolated electrode cell designs which allow for the absorption of only one of the electrochromic species within an electro-optic cell to be observed in a particular region of the cell without interference by other absorptive species.

Accordingly, in one aspect, provided herein are electro-optic cells containing a first substrate having a first surface and a second surface; a second substrate having a third surface and a fourth surface; a sealing member; and an electrochromic medium; wherein the second surface and the third surface are positioned to face each other; the sealing member is positioned in a spaced apart relationship between the second and third surfaces to define a chamber containing the electrochromic medium; one or more active anode regions and one or more active cathode regions are located on at least one of the second and third surfaces; the one or more active anode regions and the one or more active cathode regions are spatially arranged so as to substantially spatially isolate at least one electrochemically activated electrochromic species from the others in functional zones of the electro-optic cell. As used herein, a "functional zone" of an electro-optic cell or electro-optic device comprises an oxidized anodic species or reduced cathodic species, but not both. As used herein, an "active cathode region" includes one or more surfaces within the cell where electroactive cathodic material can be reduced. As used herein, an "active anodic region" includes one or more surfaces within the cell where electroactive anodic material can be oxidized.

In another aspect, provided herein are electro-optic cells containing a first substrate having a first surface and a second surface; a second substrate having a third surface and a fourth surface; a sealing member; and an electrochromic medium; wherein the second and third surfaces are substantially parallel to one another; the sealing member is positioned between the first substrate and second substrate to define a chamber containing the electrochromic medium; the second surface and the third surface are proximate to one another; the second surface includes a conductive layer; the third surface includes a second conductive layer; an active cathode region is present in one or more of the first conductive layer and the second conductive layer; an active anode region is present in one or more of the first conductive layer and the second conductive layer; and (1) the active anode region is at least partially not occluded by (i.e., interfered by during observation) the active cathode region when the chamber is viewed from any vantage point perpendicular to the second surface; or (2) the active cathode region is at least partially not occluded by the active anode region when the chamber is viewed from any vantage point perpendicular to the second surface. In some embodiments, a non-active region is present in one or more of the first conductive layer and the second conductive layer, the non-active region being unable to reduce or oxidize electroactive material in the electrochromic medium. In some embodiments, the active anode region is at least partially occluded by the non-active region when the chamber is viewed from any vantage point perpendicular to the second surface. In some embodiments, the active cathode region is at least partially occluded by the non-active region when the chamber is viewed from any vantage point perpendicular to the second surface. In some embodiments, the first and second surfaces are substantially parallel to one another. In some embodiments, the third and fourth surfaces are substantially parallel to one another.

In another aspect, provided herein are electro-optic cells containing a first substrate having a first surface and a second surface, the first and second surfaces are substantially parallel to one another; a second substrate having a third surface and a fourth surface, the third and fourth surfaces are substantially parallel to one another; a sealing member; and an electrochromic medium; wherein the first and second substrates are substantially parallel to one another; the sealing member is positioned between the first substrate and second substrate to define a chamber containing the electrochromic medium; the second surface and the third surface are proximate to one another; the second surface includes a conductive layer; the third surface includes a second conductive layer; an active cathode region is present in one or more of the first conductive layer and the second conductive layer; an active anode region is present in one or more of the first conductive layer and the second conductive layer; and (1) the active anode region is at least partially not occluded by the active cathode region when the chamber is viewed from any vantage point perpendicular to the second surface; or (2) the active cathode region is at least partially not occluded by the active anode region when the chamber is viewed from any vantage point perpendicular to the second surface. In some embodiments, a non-active region is present in one or more of the first conductive layer and the second conductive layer, the non-active region being unable to reduce or oxidize electroactive material in the electrochromic medium. In some embodiments, the active anode region is at least partially occluded by the non-active region when the chamber is viewed from any vantage point perpendicular to the second surface. In some embodiments, the active cathode region is at least partially occluded by the non-active region when the chamber is viewed from any vantage point perpendicular to the second surface.

In another aspect, provided herein are electro-optic cells containing a first substrate having a first surface and a second surface, the first and second surfaces are substantially parallel to one another; a second substrate having a third surface and a fourth surface, the third and fourth surfaces are substantially parallel to one another; a sealing member; and an electrochromic medium; wherein the first and second substrates are substantially parallel to one another; the sealing member is positioned between the first substrate and second substrate to define a chamber containing the electrochromic medium; the second surface and the third surface are proximate to one another; the second surface includes a conductive layer; an active cathode region and an active anode region are present in the conductive layer; and (1) the active anode region is at least partially not occluded by the active cathode region when the chamber is viewed from any vantage point perpendicular to the second surface; or (2) the active cathode region is at least partially not occluded by the active anode region when the chamber is viewed from any vantage point perpendicular to the second surface. In some embodiments, a non-active region is present in the conductive layer, the non-active region being unable to reduce or oxidize electroactive material in the electrochromic medium.

In another aspect, provided herein are electro-optic cells containing a first substrate having a first surface and a second surface, the first and second surfaces are substantially parallel to one another; a second substrate having a third surface and a fourth surface, the third and fourth surfaces are substantially parallel to one another; a sealing member; and an electrochromic medium; wherein the first and second substrates are substantially parallel to one another; the sealing member is positioned between the first substrate and second substrate to define a chamber containing the electrochromic medium; the second surface and the third surface are proximate to one another; the second surface includes a conductive layer; an active cathode region and an active anode region are present in the conductive layer; and the active anode region is not occluded by the active cathode region when the chamber is viewed from any vantage point perpendicular to the second surface. In some embodiments, a non-active region is present in the conductive layer, the non-active region being unable to reduce or oxidize electroactive material in the electrochromic medium.

In another aspect, provided herein are electro-optic devices containing a first substrate having a first surface and a second surface; a second substrate having a third surface and a fourth surface; a sealing member; and an electrochromic medium; wherein the second and third surfaces are substantially parallel to one another; the sealing member is positioned between the first substrate and second substrate to define a chamber containing the electrochromic medium; the second surface and the third surface are proximate to one another; the second surface includes a conductive layer; the third surface includes a second conductive layer; an active cathode region is present in one or more of the first conductive layer and the second conductive layer; an active anode region is present in one or more of the first conductive layer and the second conductive layer; and (1) the active anode region is at least partially not occluded by (i.e., interfered by during observation) the active cathode region when the chamber is viewed from any vantage point perpendicular to the second surface; or (2) the active cathode region is at least partially not occluded by the active anode region when the chamber is viewed from any vantage point perpendicular to the second surface. In some embodiments, a non-active region is present in one or more of the first conductive layer and the second conductive layer, the non-active region being unable to reduce or oxidize electroactive material in the electrochromic medium. In some embodiments, the active anode region is at least partially occluded by the non-active region when the chamber is viewed from any vantage point perpendicular to the second surface. In some embodiments, the active cathode region is at least partially occluded by the non-active region when the chamber is viewed from any vantage point perpendicular to the second surface. In some embodiments, the first and second surfaces are substantially parallel to one another. In some embodiments, the third and fourth surfaces are substantially parallel to one another.

In another aspect, provided herein are electro-optic devices containing a first substrate having a first surface and a second surface, the first and second surfaces are substantially parallel to one another; a second substrate having a third surface and a fourth surface, the third and fourth surfaces are substantially parallel to one another; a sealing member; and an electrochromic medium; wherein the first and second substrates are substantially parallel to one another; the sealing member is positioned between the first substrate and second substrate to define a chamber containing the electrochromic medium; the second surface and the third surface are proximate to one another; the second surface includes a conductive layer; the third surface includes a second conductive layer; an active cathode region is present in one or more of the first conductive layer and the second conductive layer; an active anode region is present in one or more of the first conductive layer and the second conductive layer; and (1) the active anode region is at least partially not occluded by the active cathode region when the chamber is viewed from any vantage point perpendicular to the second surface; or (2) the active cathode region is at least partially not occluded by the active anode region when the chamber is viewed from any vantage point perpendicular to the second surface. In some embodiments, a non-active region is present in one or more of the first conductive layer and the second conductive layer, the non-active region being unable to reduce or oxidize electroactive material in the electrochromic medium. In some embodiments, the active anode region is at least partially occluded by the non-active region when the chamber is viewed from any vantage point perpendicular to the second surface. In some embodiments, the active cathode region is at least partially occluded by the non-active region when the chamber is viewed from any vantage point perpendicular to the second surface.

In another aspect, provided herein are electro-optic devices containing a first substrate having a first surface and a second surface, the first and second surfaces are substantially parallel to one another; a second substrate having a third surface and a fourth surface, the third and fourth surfaces are substantially parallel to one another; a sealing member; and an electrochromic medium; wherein the first and second substrates are substantially parallel to one another; the sealing member is positioned between the first substrate and second substrate to define a chamber containing the electrochromic medium; the second surface and the third surface are proximate to one another; the second surface includes a conductive layer having both an active cathode region and an active anode region. In some embodiments, (1) the active anode region is at least partially not occluded by the active cathode region when the chamber is viewed from any vantage point perpendicular to the second surface; or (2) the active cathode region is at least partially not occluded by the active anode region when the chamber is viewed from any vantage point perpendicular to the second surface. In some embodiments, a non-active region is present in the conductive layer, the non-active region being unable to reduce or oxidize electroactive material in the electrochromic medium.

In some embodiments of the electro-optic cells or devices described herein, the first substrate is offset with respect to the second substrate.

In some embodiments of the electro-optic cells or devices described herein, a portion of the active cathode region is not occluded by the active anode region when the chamber is viewed from any vantage point perpendicular to the second surface. In some embodiments, the portion of the active cathode region is 1%-99% of the active cathode region. This includes 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, and 99%, including increments therein. In some embodiments, 1%-50%, 1%-60%, 1%-80%, 1%-90%, 1%-99%, 5%-50%, 5%-60%, 5%-80%, 5%-90%, 5%-99%, 10%-50%, 10%-60%, 10%-80%, 10%-90%, 10%-99%, 20%-50%, 20%-60%, 20%-70%, 20%-80%, 20%-90%, 20%-99%, 30%-50%, 30%-60%, 30%-70%, 30%-80%, 30%-90%, 30%-99%, 40%-60%, 40%-70%, 40%-80%, 40%-90%, 40%-99%, 50%-70%, 50%-80%, 50%-90%, 50%-99%, 60%-80%, 60%-90%, 60%-99%, 70%-90%, 70%-99%, 80%-90%, 80%-99%, 90%-99%, including ranges therein, of the active cathode region is not occluded by the active anode region when the chamber is viewed from any vantage point perpendicular to the second surface.

In some embodiments of the electro-optic cells or devices described herein, a portion of the active anode region is not occluded by the active cathode region when the chamber is viewed from any vantage point perpendicular to the second surface. In some embodiments, the portion of the active anode region is 1%-99% of the active anode region. This includes 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, and 99%, including increments therein. In some embodiments, 1%-50%, 1%-60%, 1%-80%, 1%-90%, 1%-99%, 5%-50%, 5%-60%, 5%-80%, 5%-90%, 5%-99%, 10%-50%, 10%-60%, 10%-80%, 10%-90%, 10%-99%, 20%-50%, 20%-60%, 20%-70%, 20%-80%, 20%-90%, 20%-99%, 30%-50%, 30%-60%, 30%-70%, 30%-80%, 30%-90%, 30%-99%, 40%-60%, 40%-70%, 40%-80%, 40%-90%, 40%-99%, 50%-70%, 50%-80%, 50%-90%, 50%-99%, 60%-80%, 60%-90%, 60%-99%, 70%-90%, 70%-99%, 80%-90%, 80%-99%, 90%-99%, including ranges therein, of the active anode region is not occluded by the active cathode region when the chamber is viewed from any vantage point perpendicular to the second surface.

In some embodiments of the electro-optic cells or devices described herein, the active anode region is not occluded by the active cathode region when the chamber is viewed from any vantage point perpendicular to the second surface.

Typically, an electro-optic cell comprises a first substrate 5a (also referred to as "substrate 1") defining a first surface and a second surface and a second substrate 5b (also referred to as "substrate 2") defining a third surface and a fourth surface (FIG. 1). Each of the second and third surfaces (also referred to as "surface 2" and "surface 3" herein) comprises a conductive layer (6a, 6b), such as ITO. The first and second substrates are positioned such that the second and third surfaces face each other in a spaced apart relationship, with a sealing member 7 in between, forming a cavity that is filled with an electrochromic medium 8. The electrochromic medium is variably transmissive to one or more wavelength bands of light. Electrical contacts are made to the second and third surface conductive layers in order to provide electrical current in order to switch the electro-optic medium between its substantially transmissive and substantially opaque states.

Figure 2:
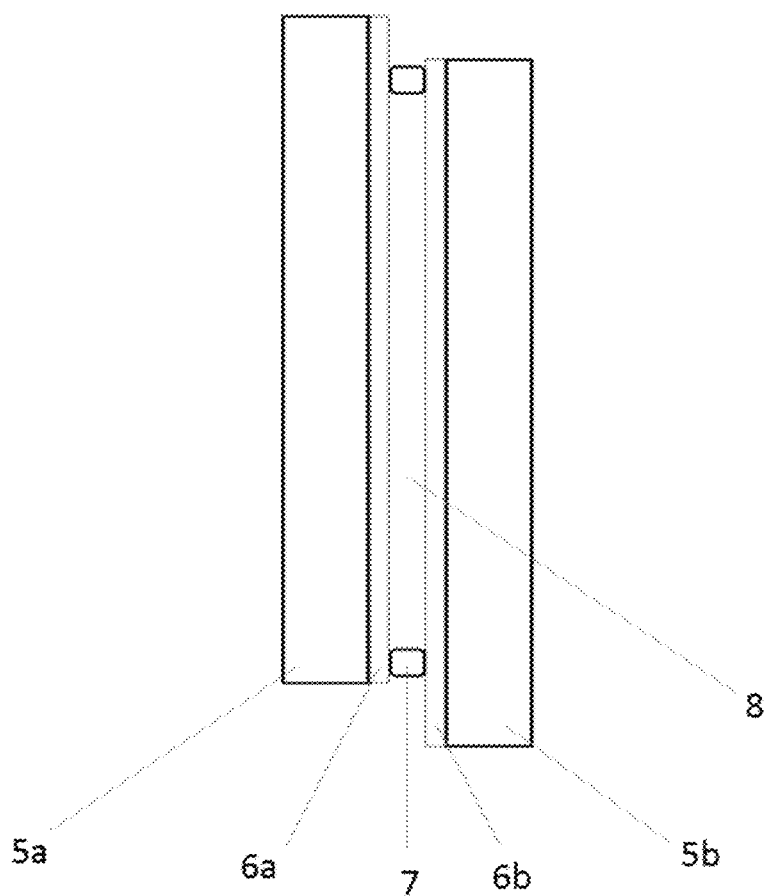
FIG. 2 is a cross-sectional schematic representation of a non-limiting example of an electro-optic cell.

Electrical contact to the conductive layers may be simplified by offsetting the two glass substrates in order to expose electrode faces at each end of the cell (FIG. 2). Many other electrical contact methods are well characterized in the prior art (e.g., as described in U.S. Pat. No. 8,274,729) and can be adapted for use herein. When the cell is powered, the anodic material is oxidized at the anode surface and the cathodic species is reduced at the cathode surface. For a freely diffusing fluid cell, these activated species (i.e., oxidized anodic species and/or reduced cathodic species) then diffuse to a region between the anode and cathode surfaces and undergo an electron transfer that returns them to the redox states they held prior to interaction with the energized electrode surfaces. Due to this diffusion process, the additive absorbance of the oxidized anodic species and the reduced cathodic species is observed in transmission through the electro-optic cell when it is powered. The present technology allows for the absorption of only one of the electrochromic species be observed in a particular region of the electro-optic cell. With the present technology, the electrode surfaces of the electro-optic cell may be configured in order to spatially separate the region of oxidation of the anodic compounds from the region of reduction of the cathodic compounds, forming one or more functional zones of the cell upon applied voltage of sufficient magnitude. As used herein, "voltage of sufficient magnitude" refers to from about 0.1 volts to about 3 volts. In some embodiments, the applied voltage of sufficient magnitude is about 800 mV to about 1.4 volts. In some embodiments, the applied voltage of sufficient magnitude is about 600 mV to about 1.4 volts. In some embodiments, at least one of the oxidized anodic species or the reduced cathodic species may lack a significant absorbance within the visible spectrum. In other words, at least one of the regions, when viewed from a vantage point perpendicular to the second surface, will remain colorless, or at least substantially colorless when the device is subjected to a potential. For example, in some embodiments, the anodic material may be a near infra-red absorbing species upon oxidation, and although the absorption increases within the near infra-red region of the spectrum (i.e., it is an electrochromic material), absorption within the visible region may remain substantially unchanged or with minimal change or coloration. In some embodiments, the devices include a configuration where the near infrared absorption of the oxidized anodic compound (in some embodiments, a triphenodithiazine) may be observed in the absence of interference by the absorbance of a cathodic species in solution. In other words, where the near infrared absorption is observed, the device, in that particular region, may appear colorless (i.e., low or minimal absorption in the visible spectrum).

Figure 3:
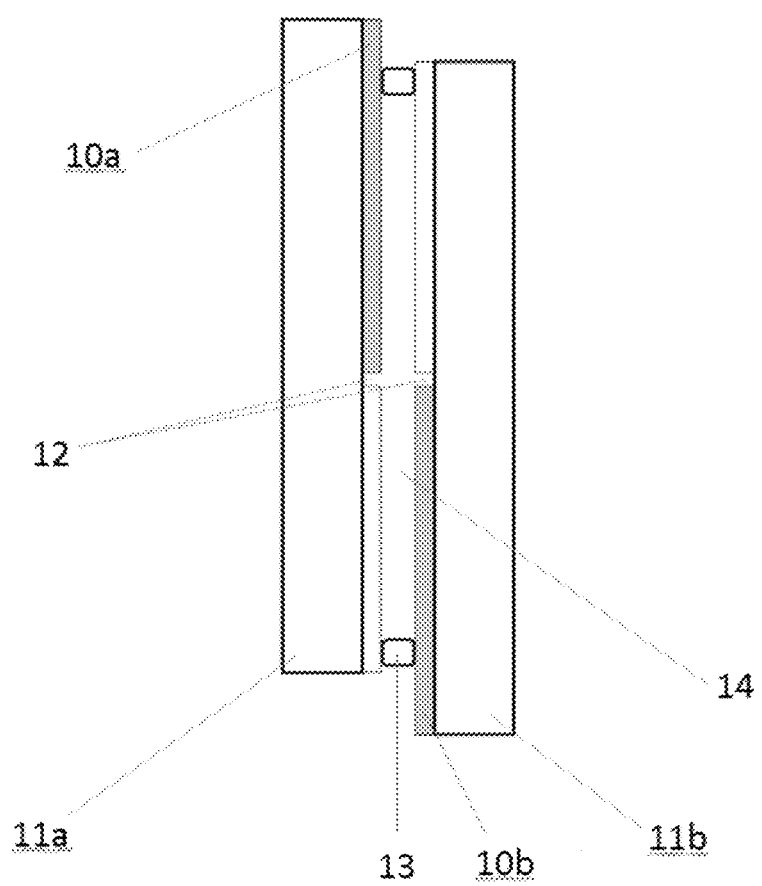
FIG. 3 is a cross-sectional schematic representation of a non-limiting example of an electro-optic cell with an isolated electrode cell design.

FIG. 3 shows a non-limiting example of an electro-optic cell with an isolated electrode cell design. A first substrate 11a, a second substrate 11b, and sealing member 13 define a chamber containing electrochromic medium 14. The active regions of the electrode layers on surfaces 2 and 3 have been isolated and are non-overlapping when viewed from any vantage point perpendicular to surfaces 2 and/or 3 (electrical isolation shown at 12). This causes reduction of the cathodic species to be limited to the active region of the cathode (10b) and oxidation of the anodic species to be limited to the active region of the anode (10a), resulting in two separate functional zones within the cell upon applied voltage of sufficient magnitude. Diffusion of electrolyte between the two zones maintains charge balance. The isolation (12) of the active electrode regions can be accomplished by many means, such as, but not limited to, ablation, etching, passivation, masking, and patterning.

Figure 4:
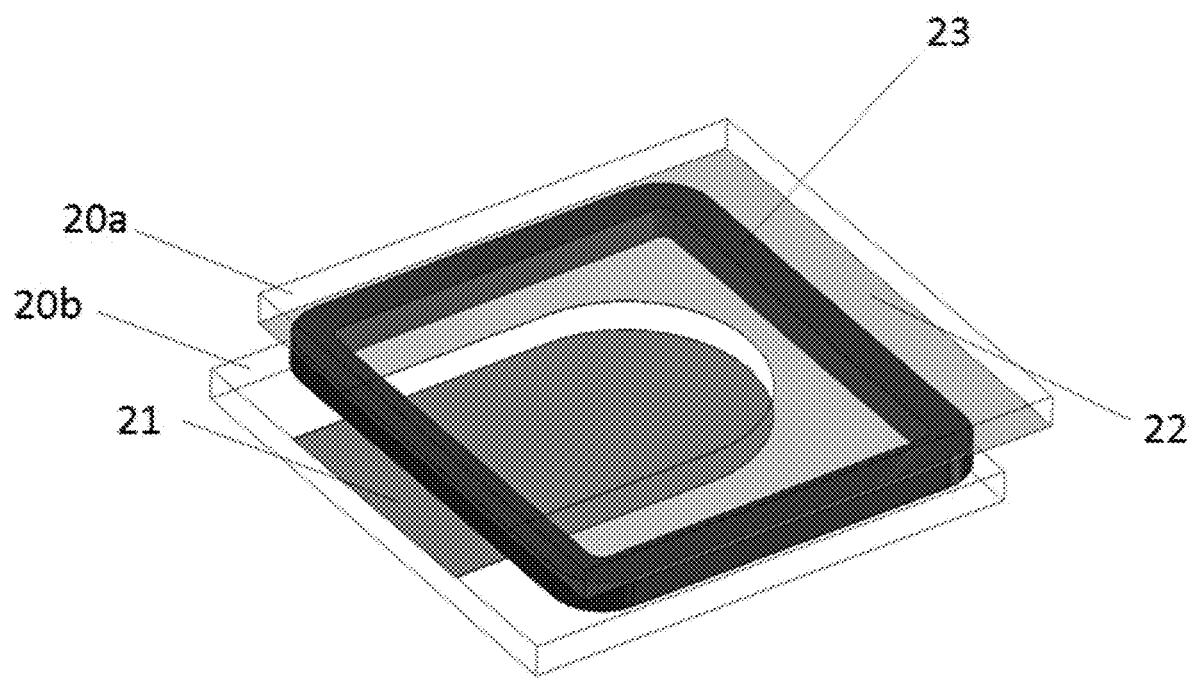
FIG. 4 is a schematic representation of an electro-optic cell with an isolated electrode cell design for a non-limiting example of an electro-optic infrared filter.

In some embodiments, an isolated electrode cell designed to be used as an electrochromic switchable optical filter has a form similar to that shown in FIG. 4. Substrate 20a and substrate 20b with sealing member 23 define a chamber with electrochromic medium. The active portion of the anode 21 is located in the active area of the filter (center) on surface 3 of substrate 20b and the active portion of the cathode 22 is limited to the perimeter, on surface 2 of substrate 20a. The active regions of the anode and cathode do not overlap across the gap defined between surfaces 2 and 3. This arrangement presents the colored version (oxidized) of the anodic species as the filter in the active area of the filter. This also isolates the colored version (reduced) of the cathodic species away from the active area of the filter so that its absorption does not affect the filter transmission.

Figure 5:
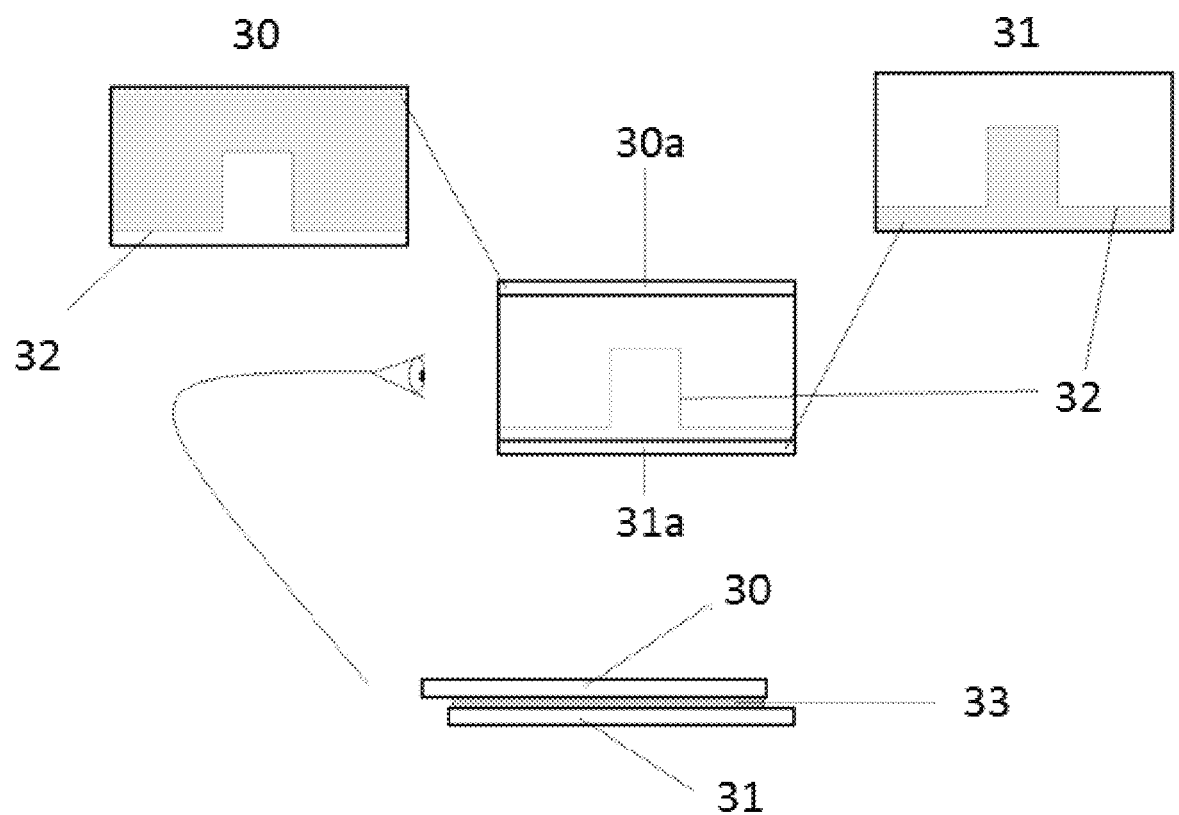
FIG. 5 depicts two schematic representations of an electro-optic cell with an isolated electrode cell design for a non-limiting example of an electro-optic infrared filter. The top half of FIG. 5 is an exploded view. The bottom half of FIG. 5 is a side-view of the same cell.

In some embodiments, an isolated electrode cell has a form similar to that shown in FIG. 5. The top half of FIG. 5 depicts an exploded view of the isolated electrode cell, and the bottom half of FIG. 5 depicts a side view of the cell. A first substrate with active cathode region 30 is arranged offset with a second substrate with active anode region 31. The two substrates with sealing member 33 define a chamber containing electrochromic medium. Active cathode region 30 (shaded in gray) is isolated from a non-active region (no shading) on the first substrate by laser ablation 32. Similarly, active anode region 31 (shaded in gray) is isolated from a non-active region (no shading) on the second substrate by laser ablation 32. Electrical contact to the cathode (30a) and to the anode (31a) regions are as shown. The non-active regions are devoid of electrical contact and cannot oxidize or reduce electroactive material in the electrochromic medium. As viewed from a vantage point perpendicular to the first and second substrates, there is little to no occlusion of the active anode region by the active cathode region, resulting in two functional zones within the cell upon applied voltage of sufficient magnitude: one zone comprising oxidized anodic species but no reduced cathodic species and another zone comprising reduced cathodic species but no oxidized anodic species. The functional zone comprising oxidized anodic species may serve as the active area of the filter. In some embodiments, an isolated electrode cell is as shown in FIG. 5, but the active cathode region is shown as 31, and the active anode region is shown as 30.

Figure 9:
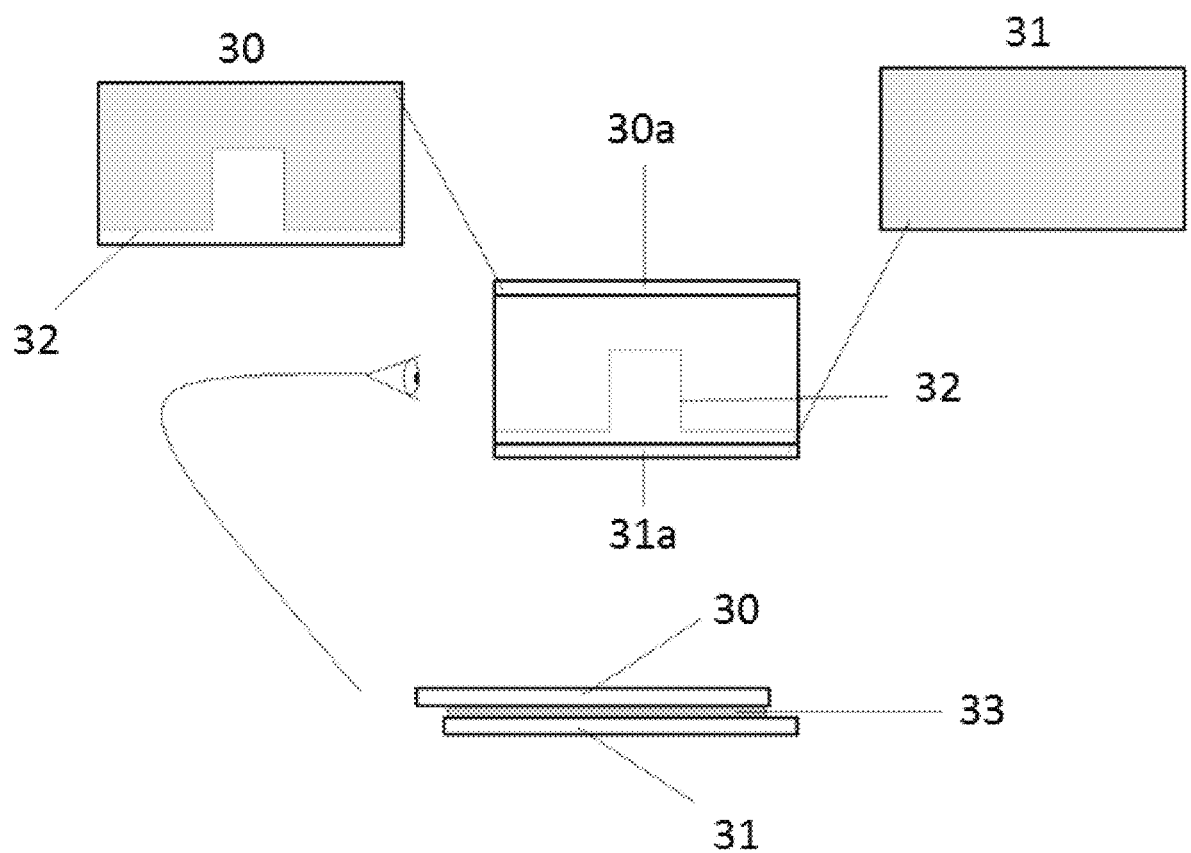
FIG. 9 depicts two schematic representations of an electro-optic cell with an isolated electrode cell design for a non-limiting example of an electro-optic infrared filter. The top half of FIG. 9 is an exploded view. The bottom half of FIG. 9 is a side-view of the same cell.

In some embodiments, an isolated electrode cell has a form similar to that shown in FIG. 9. The top half of FIG. 9 depicts an exploded view of the isolated electrode cell, and the bottom half of FIG. 9 depicts a side view of the cell. A first substrate with active cathode region 30 is arranged offset with a second substrate with active anode region 31. The two substrates with sealing member 33 define a chamber containing electrochromic medium. Active cathode region 30 (shaded in gray) is isolated from a non-active region (no shading) on the first substrate by laser ablation 32. No laser ablation is performed on the second substrate, on which active anode region 31 is located. Electrical contact to the cathode (30a) and to the anode (31a) regions are as shown. The non-active region is devoid of electrical contact and cannot oxidize or reduce electroactive material in the electrochromic medium. As viewed from a vantage point perpendicular to the first and second substrates, there is partial occlusion of the active anode region by the active cathode region, resulting in one functional zone within the cell upon applied voltage of sufficient magnitude, the functional zone comprising oxidized anodic species. This functional zone may serve as the active area of the filter. In some embodiments, an isolated electrode cell is as shown in FIG. 9, but the active cathode region is shown as 31, and the active anode region is shown as 30.

Figure 10:
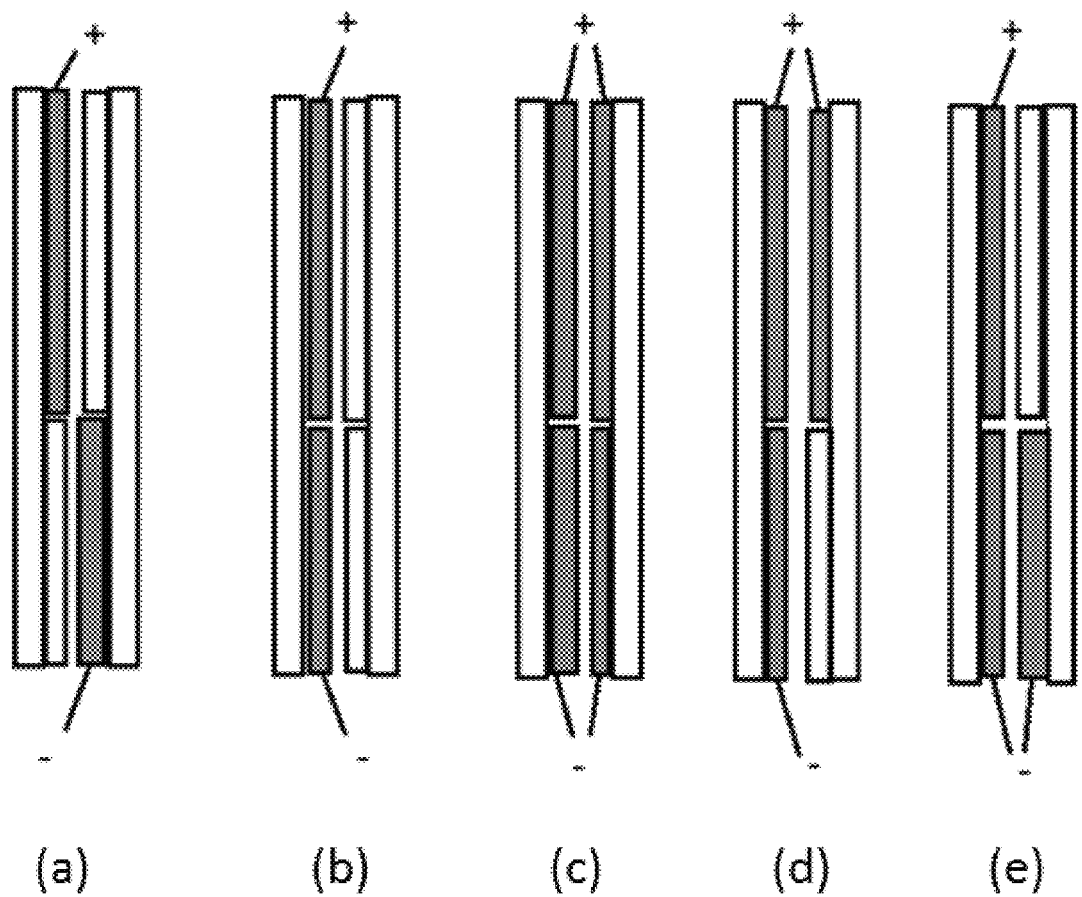
FIG. 10 depicts side-views of five non-limiting examples of an electro-optic cell with an isolated electrode cell design. Between the first and second substrates, active electrode regions are depicted with shading, and non-active regions remain unshaded. For the sake of clarity, the sealing member of the cell is omitted.

In some embodiments, an isolated electrode cell has a form similar to one of the configurations depicted in FIG. 10, wherein in between the first and second substrates, active electrode regions are indicated with gray shading and non-active regions have no shading (and for the sake of clarity, the sealing member is omitted). Active cathode regions are marked with "−" and active anode regions are marked with "+". In some embodiments, an isolated electrode cell has a form similar to one of the configurations depicted in FIG. 10, but the first and second substrates may be offset with respect to one another.

In some embodiments, the isolated electrode cell comprises an active cathode region that is isolated from a non-active region on the first substrate, and an active anode region that is isolated from a non-active region on the second substrate, wherein the active anode region is not occluded by the active cathode region when viewed from any vantage point perpendicular to the second surface (see, e.g., configuration (a) in FIG. 10).

In some embodiments, the isolated electrode cell comprises an active cathode region that is isolated from an active anode region on the first substrate, and the second substrate has no active cathode region nor active anode region (see, e.g., configuration (b) in FIG. 10). In such embodiments, the active anode region is not occluded by the active cathode region when viewed from any vantage point perpendicular to the second surface.

In some embodiments, the isolated electrode cell comprises a first active cathode region that is isolated from first active anode region on the first substrate, and a second active cathode region that is isolated from a second active anode region on the second substrate (see, e.g., configuration (c) in FIG. 10). In such embodiments, the active anode regions are not occluded by the active cathode regions when viewed from any vantage point perpendicular to the second surface.

In some embodiments, the isolated electrode cell comprises a first active cathode region that is isolated from first active anode region on the first substrate, and a second active cathode region that is isolated from a non-active region on the second substrate (see, e.g., configuration (e) in FIG. 10). In such embodiments, the active anode region is not occluded by the active cathode regions when viewed from any vantage point perpendicular to the second surface.

In some embodiments, the isolated electrode cell comprises a first active cathode region that is isolated from first active anode region on the first substrate, and a second active anode region that is isolated from a non-active region on the second substrate (see, e.g., configuration (d) in FIG. 10). In such embodiments, the active anode regions are not occluded by the active cathode region when viewed from any vantage point perpendicular to the second surface.

Figure 11:
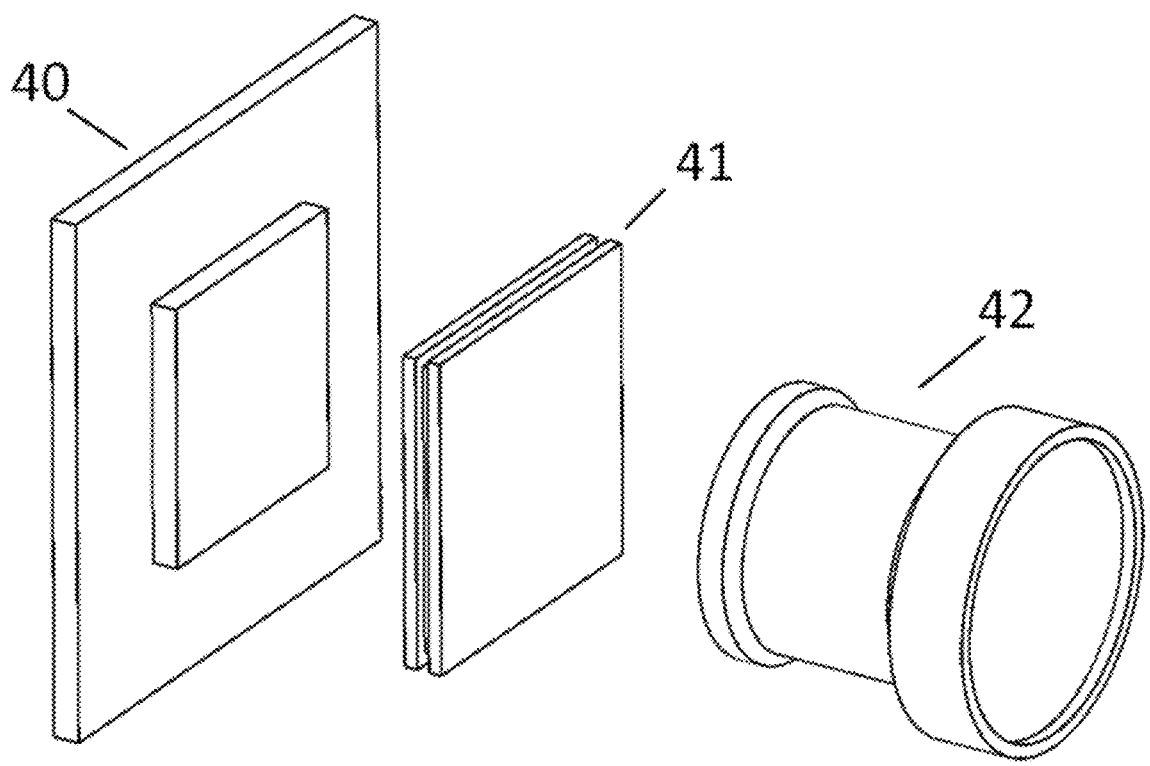
FIG. 11 depicts a non-limiting example of an imager assembly comprising a switchable electro-optic infrared filter described herein.

A switchable electro-optic infrared filter described herein may be incorporated into an imager assembly as shown in FIG. 11, wherein, for example, the filter 41 may be situated between an imager on a circuit board 40 and a lens assembly 42.

Figure 12:
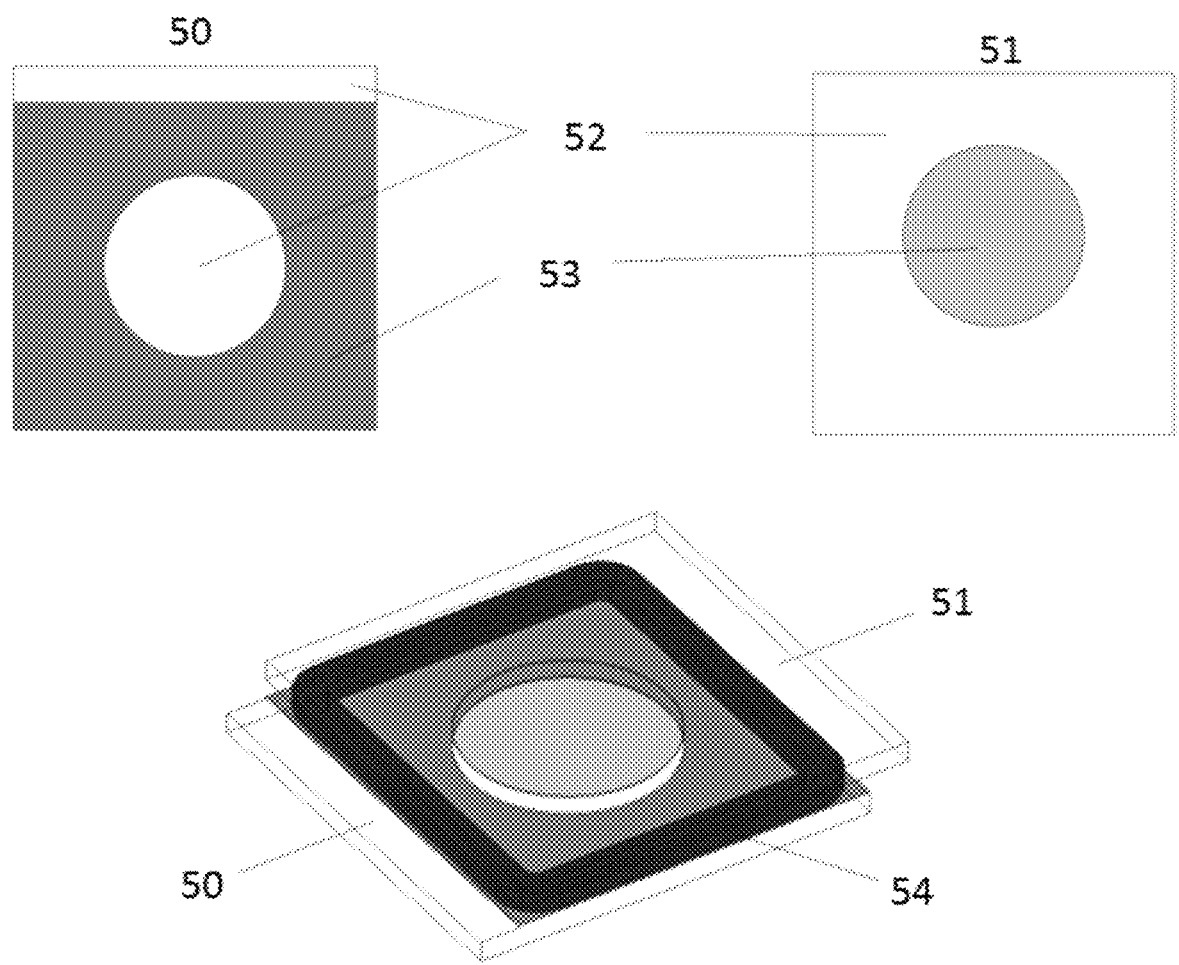
FIG. 12 depicts a schematic representation of a non-icing exam e of an electro-optic cell with an isolated electrode cell design.

In some embodiments, an isolated electrode cell has a form similar to that shown in FIG. 12. An anode plate 50 (comprising a first substrate and a first conductive layer) and a cathode plate 51 (comprising a second substrate and a second conductive layer) are arranged offset with respect to one another. The two plates with sealing member 54 define a chamber containing electrochromic medium. Anode plate 50 and cathode plate 51 are masked in certain regions 53 (shaded in gray). Masked regions 53 serve as non-active regions that cannot oxidize or reduce electroactive material in the electrochromic medium. The masking material may be any material with dielectric properties, such as, but not limited to, polyimide, $SiO_2$, $Al_2O_3$, polyvinyl alcohol, and photo-resist. Remaining regions 52 (no shading) are exposed and, when located within the chamber, may serve as active electrode regions. In some embodiments, an isolated electrode cell is as shown in FIG. 12, but the cathode plate is shown as 50, and the anode plate is shown as 51.

Figure 13:
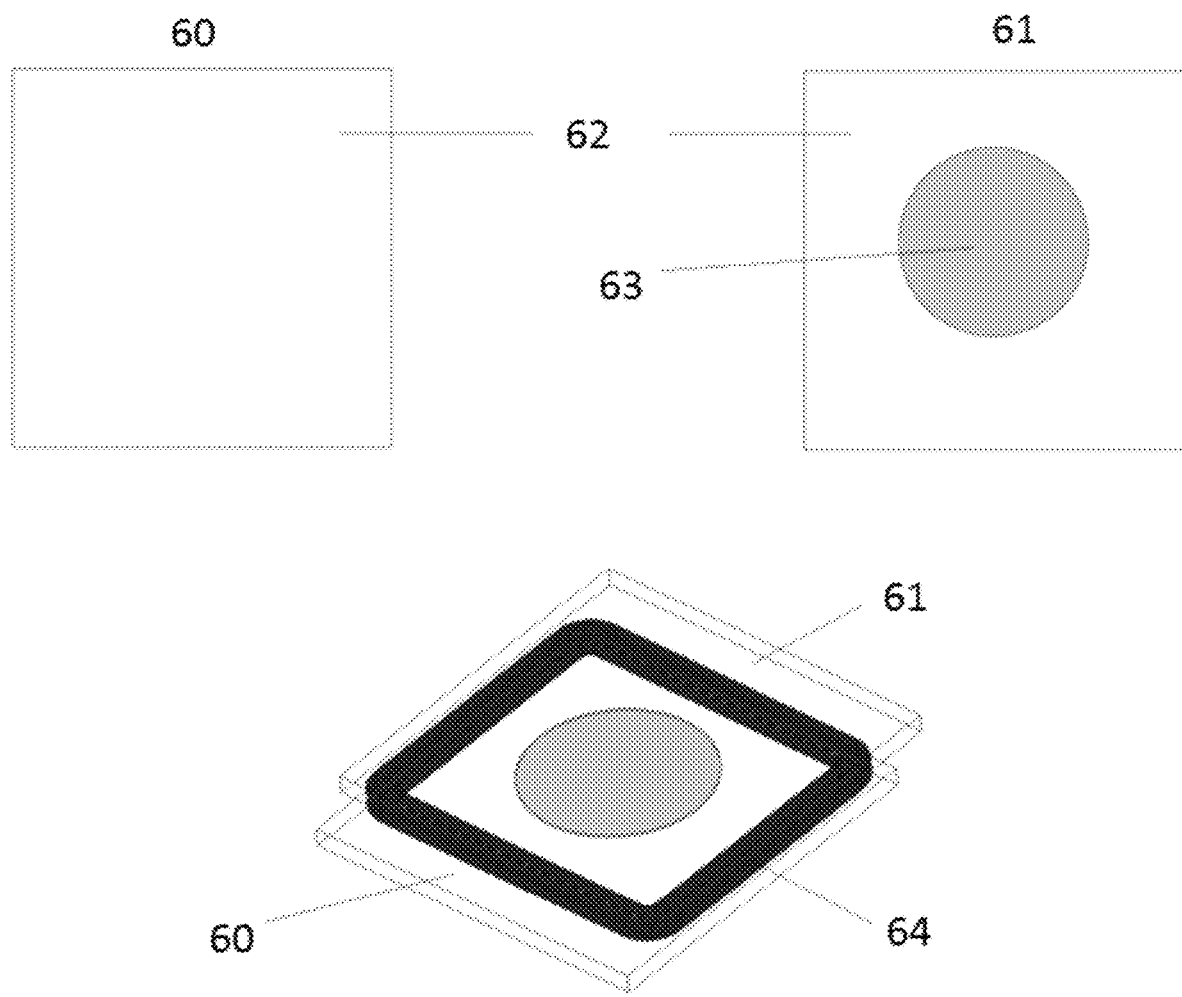
FIG. 13 depicts a schematic representation of a non-limiting example of an electro-optic cell with an isolated electrode cell design.

In some embodiments, an isolated electrode cell has a form similar to that shown in FIG. 13. An anode plate 60 (comprising a first substrate and a first conductive layer) and a cathode plate 61 (comprising a second substrate and a second conductive layer) are arranged offset with respect to one another. The two plates with sealing member 64 define a chamber containing electrochromic medium. Cathode plate 61 is masked in a region 63 (shaded in gray). Masked region 63 serves as a non-active region that cannot reduce electroactive material in the electrochromic medium. Remaining regions 62 (no shading) are exposed and, when located within the chamber, may serve as active electrode regions. In some embodiments, an isolated electrode cell is as shown in FIG. 13, but the cathode plate is shown as 60, and the anode plate is shown as 61.

Figure 14:
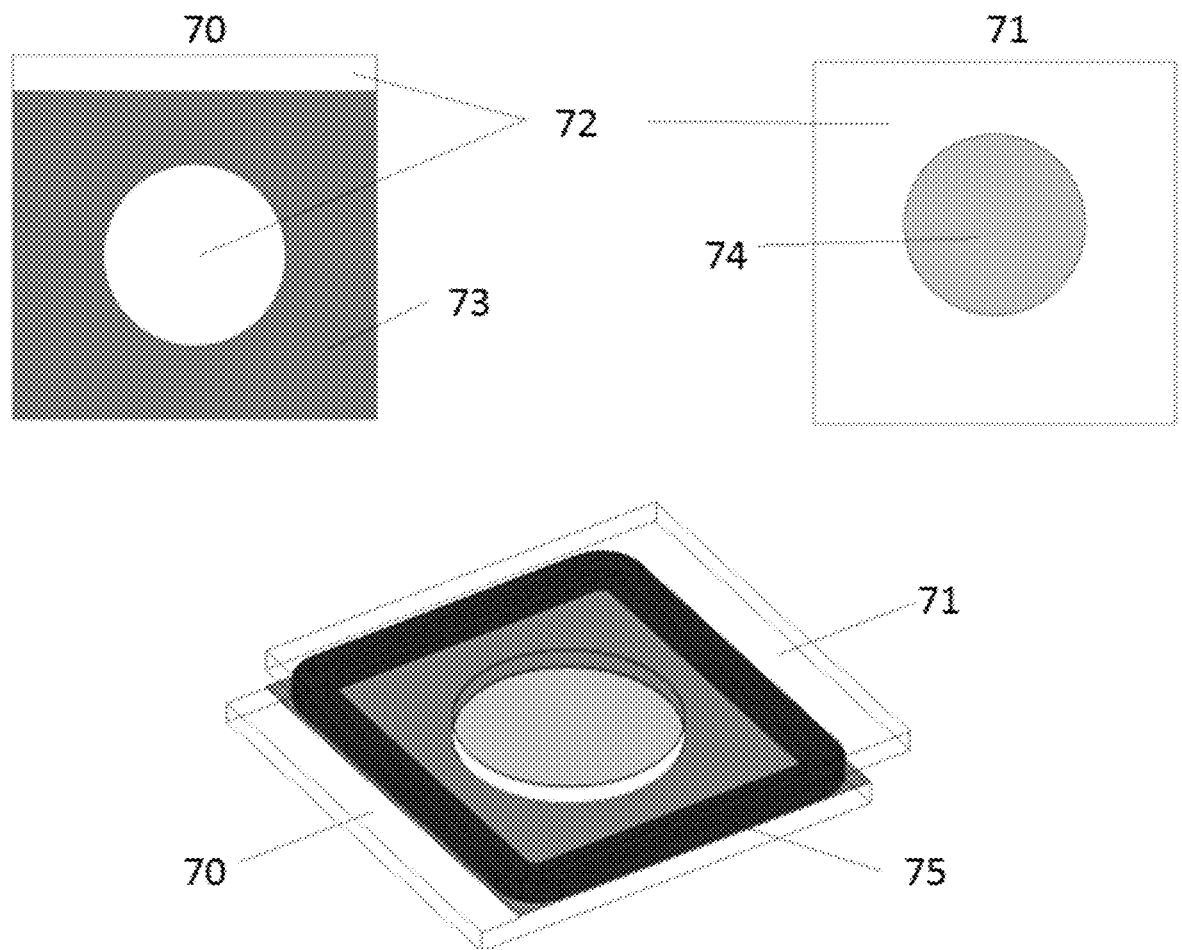
FIG. 14 depicts a schematic representation of a non-limiting example of an electro-optic cell with an isolated electrode cell design.

In some embodiments, an isolated electrode cell has a form similar to that shown in FIG. 14. A cathode plate 70 (comprising a first substrate and a first conductive layer) and an anode plate 71 (comprising a second substrate and a second conductive layer) are arranged offset with respect to one another. The two plates with sealing member 75 define a chamber. Cathode plate 70 includes a cathodic electrochromic polymer layer 73 (shaded in gray), and anode plate 71 includes an anodic electrochromic polymer layer 74 (shaded in gray). Remaining regions 72 (no shading) are not covered by any electrochromic polymer layer and are exposed. In some embodiments, an isolated electrode cell is as shown in FIG. 14, but the cathode plate is shown as 71, and the anode plate is shown as 70.

Figure 15:
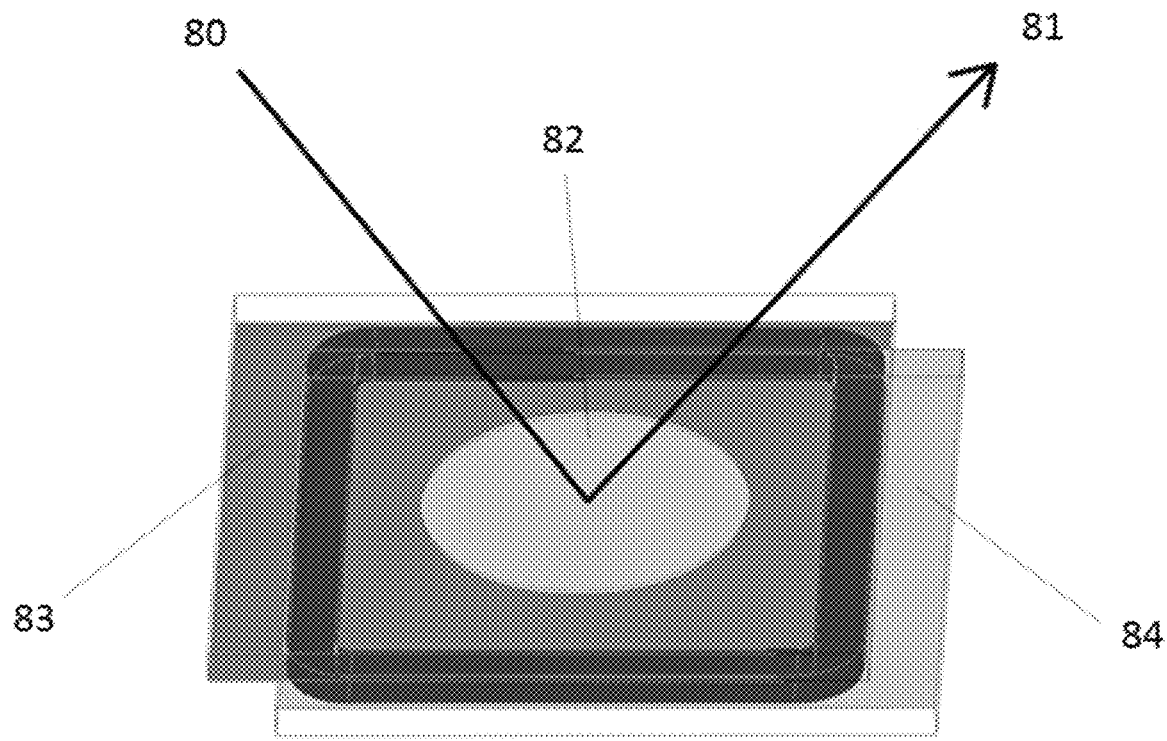
FIG. 15 depicts a schematic representation of a non-limiting example of an electro-optic cell with an isolated electrode cell design.

In some embodiments, an isolated electrode cell has a form similar to that shown in FIG. 15. An anode plate 83 (comprising a first substrate and a first conductive layer) and a cathode plate 84 (comprising a second substrate and a second conductive layer) are arranged offset with respect to one another. The two substrates with a sealing member define a chamber containing electrochromic medium. The first conductive layer on anode plate 83 is transparent and comprises a non-active region 82 obtained through, for example, laser ablation. The second conductive layer on cathode plate 84 is a continuous metallic reflective conductive layer (containing, for example, chromium, silver, rhodium, etc., or any combination thereof). Incident light ray 80 is transmitted through the electrochromic medium, reflected (81) from the front surface of cathode plate 84 and re-transmitted through the electrochromic medium, effectively doubling the optical density of the electrochromic layer. In some embodiments, an isolated electrode cell is as shown in FIG. 15, but the cathode plates is shown as 83, and the anode plate is shown as 84.

In some embodiments, the first substrate may be fabricated from any one of a number of materials that are transparent or substantially transparent in the visible and NIR regions of the electromagnetic spectrum, such as, for example, borosilicate glass, soda lime glass, natural and synthetic polymeric resins, plastics, and/or composites including polyesters (e.g. PET), polyimides (PI), polycarbonates, polysulfones, polyethylene naphthalate (PEN), ethylene vinyl acetate (EVA), acrylate polymers, as well as Topas®. In another embodiment, the first substrate is fabricated from a sheet of glass having a thickness ranging from about 0.10 millimeters (mm) to about 12.7 mm. This may include any range of thickness such as from about 0.50 mm to about 1.50 mm, or from about 0.65 mm to about 1.00 mm. Of course, the thickness of the substrate will depend upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, electrochromic devices in accordance with the present invention can be, during normal operation, exposed to extreme temperature variation as well as substantial UV radiation, emanating primarily from the sun. It will be further understood that first substrate and/or second substrate may comprise a UV absorbing layer and/or contain a UV absorbing material to help protect the substrate(s) and/or the electrochromic media from UV damage.

In some embodiments, the second substrate may be fabricated from similar materials as that of the first substrate. However, if the electrochromic device is a mirror, or the electrochromic device includes a mirrored surface, depending upon the surface that incorporates the mirror, the substrate may or may not be transparent. For example, the substrate may be transparent where the distal surface is the mirrored surface, and it may not be transparent where a proximal surface is mirrored. Accordingly, materials for use as the second substrate may include polymers, metals, glass, and ceramics. The second substrate may be fabricated from a sheet of glass or plastic having a thickness ranging from about 0.10 mm to about 12.7 mm. This may include thicknesses from about 0.50 mm to about 1.50 mm, or from about 0.65 mm to about 1.00 mm. If the first and second substrates are fabricated from sheets of glass, then the glass can optionally be tempered, heat strengthened, chemically strengthened, and/or laminated prior to or subsequent to being coated with layers of electrically conductive material.

One or more layers of electrically conductive material may be associated with the rear surface of the first substrate. These layers serve as an electrode for the electrochromic device. Electrically conductive material is desirably a material that: (a) is substantially transparent in the visible and/or NIR and/or IR region of the electromagnetic spectrum; (b) bonds reasonably well to the first substrate; (c) maintains this bond when associated with a sealing member; (d) is generally resistant to corrosion from materials contained within the electrochromic device; and (e) exhibits minimal diffuse or specular reflectance as well as sufficient electrical conductance. It is contemplated that the electrically conductive material may be fabricated from fluorine doped tin oxide (FTO), for example TEC glass, indium/tin oxide (ITO), doped zinc oxide, indium zinc oxide, metal oxide/metal/metal oxide (wherein metal oxide can be substituted with metal carbide, metal nitride, metal sulfide, etc.), or wire metal grid, or other materials known to those having ordinary skill in the art.

One or more layers of an electrically conductive material made of the same or different materials as those associated with the rear surface of the first substrate may be associated with the front surface of the second substrate. The electrically conductive material may be operatively bonded to electrically conductive material associate with the first substrate by a sealing member. Once bonded, the sealing member, plug and/or the juxtaposed portions of electrically conductive materials may serve to generally define an inner peripheral geometry of a chamber. Alternatively, edge sealing techniques may be utilized which are disclosed in U.S. Pat. No. 7,372,611.

In some embodiments, the first substantially transparent substrate and second substantially transparent substrate have a cell distance of less than 600 µm. In another embodiment, the first substantially transparent substrate and second substantially transparent substrate have a cell distance of about 10 µm to about 600 µm, about 200 µm to about 300 µm, about 225 µm to about 275 µm, or ranges between any two of these values (including endpoints). In another embodiment, the first substantially transparent substrate and second substantially transparent substrate have a cell distance of about 350 µm, 300 µm, 275 µm, 250 µm, 225 µm, 200 µm, 175 µm, 150 µm, 125 µm, 100 µm, 90 µm, 80 µm, 70 µm, 60 µm, 50 µm, 40 µm, 30 µm, 20 µm, 10 µm, or ranges between any two of these values (including endpoints). In another embodiment, the first substantially transparent substrate and second substantially transparent substrate have a cell distance of about 135 µm.

In some embodiments, the electro-optic cell has a tranmissivity in the colorless state (e.g., transmissive state), or substantially colorless state, of greater than 10%, 20%, 30%, 40%, 50%, 60%, 70%, or 80% for light of a specific range of wavelengths. In some embodiments, the electro-optic cell has a tranmissivity in the colored state (e.g., opaque state), or substantially colored state, of less than 80%, 60%, 50%, 40%, 30%, 20%, 10%, 9%, 8%, 7%, 6%, 5%, 4%, 3%, 2%, 1%, 0.5%, or 0.1% for light of a specific range of wavelengths. Varying levels of transmissivity and opacity to light of a specific range of wavelengths may be obtained by partially transitioning the electro-optic cell between the substantially colorless (i.e., transparent) and substantially colored (i.e., opaque) states. In some embodiments, the light of a specific range of wavelengths is near infrared light.

In some embodiments, the sealing member may include any material that is configured to adhesively bond to the electrically conductive materials coated on the first and second substrate to, in turn, seal a chamber, (in certain embodiments in cooperation with a plug and fill port) so that electrochromic composition does not inadvertently leak out of the chamber or be exposed to the outside atmosphere. It is also contemplated that the sealing member extends all the way to rear surface and front surface of their respective substrates. In such an embodiment, the layers of electrically conductive material coated on the first and second substrates may be partially removed where the sealing member is positioned. If the electrically conductive materials are not associated with their respective substrates, then the sealing member preferably bonds well to glass or other substrate. It will be understood that sealing member can be fabricated from any one of a number of materials including, for example, those disclosed in U.S. Pat. Nos. 4,297,401; 4,418,102; 4,695,490; 5,596,023; 5,596,024; 6,157,480; and 6,714,334.

Electrochromic medium includes at least one solvent, at least one cathodic electroactive material and at least one anodic electroactive material. Typically, the cathodic and anodic electroactive materials are electrochromic. It will be understood that regardless of its ordinary meaning, the term "electroactive" will be defined herein as a material or compound that undergoes a modification in its oxidation state upon exposure to a particular electrical potential difference. Additionally, it will be understood that the term "electrochromic" will be defined herein, regardless of its ordinary meaning, as a material or compound that exhibits a change in its extinction coefficient at one or more wavelengths upon exposure to a particular electrical potential difference.

Illustrative anodic electroactive compounds may include, but are not limited to, ferrocene, substituted ferrocenes, phenazine, substituted phenazines, phenothiazine, triphenodithiazines, substituted phenothiazines including substituted dithiazines, thianthrene, and substituted thianthrenes. Examples of anodic electroactive compounds may include di-tert-butyl-diethylferrocene, 5,10-dimethyl-5,10-dihydrophenazine (DMP), 3,7,10-trimethylphenothiazine, 2,3,7,8-tetramethoxy-thianthrene, 10-methylphenothiazine, tetramethylphenazine (TMP), bis(butyltriethylammonium)-para-methoxytriphenodithiazine (TPDT), polymer films such as polyaniline, polythiophene, and polymeric metallocenes, a solid transition metal oxides including, but not limited to, oxides of vanadium, nickel, iridium, as well as numerous heterocyclic compounds. It will be understood that numerous other anodic electroactive compounds are contemplated for use including those disclosed in U.S. Pat. Nos. 4,902,108; 6,188,505; 6,710,906; and 7,428,091.

In some embodiments, the anodic electroactive material is a triphenodithiazine represented by Formula (I):

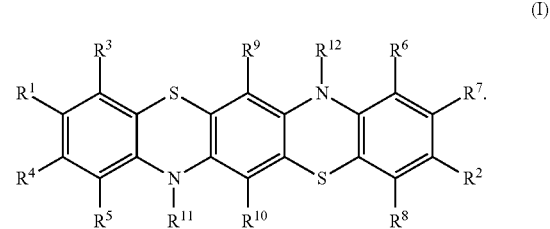

In Formula (I), $R^1$ and $R^2$ are individually alkyl, alkoxy, or aryloxy; $R^3$, $R^4$, $R^5$, $R^6 R^7$, $R^8$ are individually H, alkoxy, or aryloxy; $R^9$ and $R^{10}$ are individually alkoxy, or aryloxy, or where $R^1$ and $R^2$ are alkyl, $R^9$ and $R^{10}$ are individually H, alkoxy, or aryloxy; $R^{11}$ and $R^{12}$ are individually alkyl or —$(CH_2)_n N^+(R^{20})_3$ [X], wherein n is from 1 to 20; each $R^{20}$ is individually alkyl; and X is an anion. In any of the above embodiments, $R^1$ and $R^2$ may be other than OMe, when $R^3$-$R^{10}$ are all H, and $R^{11}$ and $R^{12}$ are —$(CH_2)_n NA^+(R^{20})_3$ [X].

In any of the above embodiments, $R^1$ and $R^2$ may individually be $C_1$-$C_{12}$-alkoxy, a group of formula $R^{21}$[$O(CH_2)_x]_q O$—, or $C_6$-$C_{20}$-aryloxy, wherein $R^{21}$ is alkyl, x is 1, 2, 3, or 4, and q is an integer from 1 to 20. In any of the above embodiments, $R^9$ and $R^{10}$ may both be an $C_1$-$C_{12}$-alkoxy, a group of formula $R^{21}$[$O(CH_2)_x]_q O$—, or $C_6$-$C_{20}$-aryloxy, wherein $R^{21}$ is alkyl, x is 1, 2, 3, or 4, and q is an integer from 1 to 20.

In some embodiments of the compound of Formula (I), $R^1$ and $R^2$ are individually alkyl; $R^3$, $R^4$, $R^5$, $R^6$, $R^7$, $R^8$ are individually H; $R^9$ and $R^{10}$ are individually H or alkoxy; $R^{11}$ and $R^{12}$ are individually $C_1$-$C_{12}$-alkyl, —$(CH_2)_n N^+(R^{20})_3$ [X], wherein n is from 1 to 10; each $R^{20}$ is individually $C_1$-$C_6$-alkyl; each $R^{50}$ is a $C_1$-$C_6$-alkyl; and X is an anion. This includes where $R^1$ and $R^2$ are individually $C_1$-$C_6$-alkyl; $R^3$, $R^4$, $R^5$, $R^6$, $R^7$, $R^8$ are individually H; $R^9$ and $R^{10}$ are individually H or $C_1$-$C_6$-alkoxy; $R^{11}$ and $R^{12}$ are individually methyl, ethyl, n-propyl, iso-propyl, n-butyl, iso-butyl, sec-butyl, t-butyl, —$(CH_2)_n N^+(R^{20})_3$ [X], wherein n is from 1 to 6; each $R^{20}$ is methyl or ethyl; and X is an anion.

In other embodiments of the compound of Formula (I), $R^1$ and $R^2$ are individually alkoxy or aryloxy; $R^3$, $R^4$, $R^5$, $R^6$, $R^7$, $R^8$ are individually H, $C_1$-$C_{12}$-alkoxy, or $C_6$-$C_{12}$-aryloxy; $R^9$ and $R^{10}$ are individually $C_1$-$C_{12}$-alkoxy, or $C_6$-$C_{12}$-aryloxy; $R^{11}$ and $R^{12}$ are individually $C_1$-$C_{12}$-alkyl or —$(CH_2)_n N^+(R^{20})_3$ [X] wherein n is from 1 to 20; each $R^{20}$ is individually $C_1$-$C_6$-alkyl; and X is an anion. This includes where $R^3$, $R^4$, $R^7$, $R^8$ are individually $C_1$-$C_{12}$-alkoxy, or $C_6$-$C_{12}$-aryloxy; and $R^5$ and $R^6$ are H. This also includes where $R^1$ and $R^2$ are individually $C_1$-$C_{12}$-alkoxy; $R^3$, $R^4$, $R^7$, $R^8$ are individually $C_1$-$C_{12}$-alkoxy; $R^5$ and $R^6$ are H; $R^9$ and $R^{10}$ are individually $C_1$-$C_{12}$-alkoxy; $R^{11}$ and $R^{12}$ are individually $C_1$-$C_{12}$-alkyl or —$(CH_2)_n N^+(R^{20})_3$ [X] wherein n is from 1 to 20; each $R^{20}$ is individually $C_1$-$C_6$-alkyl; and X is an anion. In one illustrative embodiment of the triphenodithiazine represented as Formula (I), $R^1$ and $R^2$ are individually methoxy, ethoxyl, n-propoxy, iso-propoxy, n-butoxy, sec-butoxy, or t-butoxy; $R^3$, $R^4$, $R^7$, $R^8$ are individually methoxy, ethoxyl, n-propoxy, iso-propoxy, n-butoxy, sec-butoxy, or t-butoxy; $R^5$ and $R^6$ are H; $R^9$ and $R^{10}$ are individually methoxy, ethoxyl, n-propoxy, iso-propoxy, n-butoxy, sec-butoxy, or t-butoxy; $R^{11}$ and $R^{12}$ are individually methyl, ethyl, n-propyl, iso-propyl, n-butyl, iso-butyl, sec-butyl, t-butyl, or —$(CH_2)_n N^+(R^{20})_3$ [X] wherein n is from 1 to 6; each $R^{20}$ is individually methyl, ethyl, n-propyl, iso-propyl, n-butyl, iso-butyl, sec-butyl, or t-butyl; and X is an anion.

In any of the above embodiments, X may be F$^-$, Cl$^-$, Br$^-$, I$^-$, $BF_4^-$, $PF_6^-$, $SbF_6^-$, $AsF_6^-$, $ClO_4^-$, $SO_3CF_3^-$, $N(CN)_2^-$, $N(CF_3SO_2)_2^-$, $C(CF_3SO_2)_3^-$, $N(SO_2C_2F_5)_2^-$, $^-Al(OC(CF_3)_3)_4$ or $^-BAr_4$, wherein Ar is a aryl or fluorinated aryl group. In one embodiment, X$^-$ is $^-BAr_4$ and Ar is a pentafluorophenyl group. In some embodiments, X is a tetrafluoroborate or a bis(trifluoromethylsulfonyl) imide anion. When shown in any compound herein multiple X's may be a mixture of two or more such anions.

In another embodiment, at least one of the anodic electroactive material includes a substituted or unsubstituted phenazine compound. In another embodiment, at least one of the anodic electroactive material includes a substituted or unsubstituted 2,7-dialkyl-5,10-dialkyl-5,10-dihydrophenazine compound. In another embodiment, at least one alkyl group of the 5,10-dialkyl groups attached to the phenazine compound includes at least 4 carbon atoms and is devoid of any β hydrogen atoms, and at least one alkyl group of the 2,7-dialkyl groups attached to the phenazine compound includes at least 4 carbons. In another embodiment, at least one alkyl group of the 5,10-dialkyl groups attached to the phenazine compound includes a substituted or unsubstituted neopentyl group, and at least one alkyl group of the 2,7-dialkyl groups attached to the phenazine compound includes a substituted or unsubstituted isopropyl, isobutyl, (2-ethylbutyl), or (2-propylpentyl) group. In some embodiments, at least one alkyl group of the 5,10-dialkyl groups attached to the phenazine compound includes a neopentyl group, and at least one alkyl group of the 2,7-dialkyl groups attached to the phenazine compound includes a 2-ethyl-1-butanol group. In another embodiment, at least one alkyl group of the 5,10-dialkyl groups attached to the phenazine compound includes a neopentyl group, and at least one alkyl group of the 2,7-dialkyl groups attached to the phenazine compound includes an isobutyl group.

Cathodic electroactive compounds may include, but are not limited to, viologens. Illustrative viologens include, but are not limited to, 1,1'-bis-2-ethylhexyl-4,4-bipyridinium tetrafluoroborate (also called 2-ethylhexyl viologen tetrafluoroborate), methyl viologen tetrafluoroborate, octyl viologen tetrafluoroborate (octylviologen), and benzyl viologen tetrafluoroborate. Additional illustrative cathodic electroactive compounds include, but are not limited to, compounds disclosed in U.S. Pat. Nos. 7,046,418; 7,855,821; 4,902,108; 6,188,505; and 6,710,906. In some embodiments, the cathodic electroactive compounds include one or more alkyl viologens. Illustrative alkyl viologens include, but are not limited to, 2-ethylhexyl viologen tetrafluoroborate; methyl viologen tetrafluoroborate; octyl viologen tetrafluoroborate (octylviologen); 1,1'-bis-isobutyl-4,4'-bipyridinium tetrafluoroborate; and 1,1'-bis 2-ethyl butyl-4,4'-bipyridinium tetrafluoroborate. In some embodiments, the alkyl viologen is selected from 1,1'-bis-2-ethylhexyl-4,4-bipyridinium tetrafluoroborate, 1,1'-bis-isobutyl-4,4'-bipyridinium tetrafluoroborate; and 1,1'-bis 2-ethyl butyl-4,4'-bipyridinium tetrafluoroborate. Moreover, it is contemplated that the cathodic electroactive compounds may include a polymer film, such as polymeric viologens.

In some embodiments, the concentration of the anodic and/or cathodic electroactive materials in the electrochromic medium may be from about 1 millimolar (mM) to about 500 mM.

In some embodiments, the concentration of the anodic and/or cathodic electroactive materials in the electrochromic medium may be from about 2 mM to about 100 mM. In some embodiments, the concentration of the cathodic electroactive compounds in the electrochromic medium is from about 40 mM to about 100 mM. In some embodiments, the concentration of the cathodic electroactive compounds in the electrochromic medium is from about 1 mM to about 3 mM.

In one embodiment, at least one of the anodic electroactive materials has a concentration of at least 1 mM. This include concentrations of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 125, 150, 175, 200, 225, 250, 275, 300, 325, 350, 375, 400, 425, 450, 475, and 500 mM, including increments therein. In another embodiment, at least one of the anodic electroactive materials has a concentration of about 1 mM to about 100 mM, about 5 mM to about 50 mM, about 7 mM to about 50 mM, or ranges between any two of these values (including endpoints). In another embodiment, at least one of the anodic electroactive materials has a concentration of about 5 mM to about 7 mM. In another embodiment, a second anodic electroactive material has a concentration of about 1 mM to about 5 mM.

In some embodiments, the total concentration of the anodic electroactive compounds is at least about 1 mM. This include concentrations of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 mM, including increments therein. In some embodiments, the total concentration of the anodic electroactive compounds is about 1 mM to about 5 mM, about 1 mM to about 10 mM, about 1 mM to about 25 mM, about 1 mM to about 50 mM, about 1 mM to about 100 mM, about 40 mM to about 100 mM, about 40 mM to about 90 mM, about 50 mM to about 100 mM, about 50 mM to about 90 mM, about 60 to about 90 mM, about 70 mM to about 80 mM, or ranges between any two of these values (including endpoints).

The electro-optic medium is operable between substantially transmissive and substantially opaque for at least one wavelength band.

The electrochromic medium may include a single-layer of material which may include small non-homogenous regions and includes solution-phase devices where a material may be contained in solution in an ionically conducting electrolyte which remains in solution in the electrolyte when electrochemically oxidized or reduced. Solution phase electroactive materials may be contained in the continuous solution-phase of a gel medium as shown in U.S. Pat. No. 5,928,572, and in International Patent Application Serial No. PCT/US98/05570, both of which are hereby incorporated herein by reference in their entirety.

In some embodiments, a single-layer, single-phase medium includes a medium where the anodic and cathodic materials are incorporated into a polymer matrix as is described in International Patent Application Serial Nos. PCT/EP98/03862 and PCT/US98/05570.

The electrochromic medium may have a layered structure including a material attached directly to an electrically conducting electrode or confined in close proximity thereto which remains attached or confined when electrochemically oxidized or reduced. Alternatively, one or more materials in the electrochromic medium may undergo a change in phase during the operation of the device. For example, a material contained in solution in the ionically conducting electrolyte forms a layer on the electrically conducting electrode when electrochemically oxidized or reduced.

In addition, electrochromic medium may include other materials, such as light absorbers, light stabilizers, thermal stabilizers, antioxidants, thickeners, viscosity modifiers, tint providing agents, redox buffers, and mixtures thereof. In some embodiments, the electrochromic medium further includes one or more UV stabilizers. In some embodiments, the electrochromic medium further includes an anodic and/or cathodic color-stabilizing redox buffer. In some embodiments, the electrochromic medium further includes a cross-linked polymer matrix, a free-standing gel, and/or a substantially non-weeping gel. Suitable redox buffers include, among others, those disclosed in U.S. Pat. No. 6,188,505. Suitable UV-stabilizers may include, but are not limited to, 2-ethyl-2-cyano-3,3-diphenyl acrylate (Uvinul® N-35 or Viosorb® 910), (2-ethylhexyl)-2-cyano-3,3-diphenyl acrylate (Uvinul® N-539), 2-(2'-hydroxy-4'-methylphenyl)benzotriazole (Tinuvin® P), 3-[3-(2H-benzotriazole-2-yl)-5-(1,1-dimethylethyl)-4-hydroxyphenyl]propionic acid pentyl ester (prepared from Tinuvin® 213 via conventional hydrolysis followed by conventional esterification; hereinafter referred to as "Tinuvin PE"); a composition of $C_{7-9}$ branched and linear alkyl esters of 3-(2H-benzotriazol-2-yl)-5-(1,1-dimethylethyl)-4-hydroxy-benzenepropanoic acid and 1-methoxy-2-propylacetate (Tinuvin® 384-2); 2,4-dihydroxybenzophenone; 2-hydroxy-4-methoxybenzophenone (Cyasorb® UV 9), and 2-ethyl-2'-ethoxyalanilide (Sanduvor® VSU). In some embodiments, the electrochromic medium contains at least one crosslinked gel matrix. In some embodiments, the electrochromic medium contains at least one crosslinked gel matrix and at least one solvent.

In some embodiments, a solvent of the electrochromic medium may include, but is not limited to, 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, γ-butyrolactone, γ-valerolactone; propylene carbonate (PC), ethylene carbonate; oligoethers; ionic liquids, such as pyridinium-, imidazolium-, and pyrrolidinium-compounds; and homogenous mixtures of any two or more such solvents. Where the solvent includes an ionic liquid, the counterion may be $F^-$, $Cl^-$, $Br^-$, $I^-$, $BF_4^-$, $PF_6^-$, $SbF_6^-$, $AsF_6^-$, $ClO_4^-$, $SO_3CF_3^-$, $N(CN)_2^-$, $N(CF_3SO_2)_2^-$, $C(CF_3SO_2)_3^-$, $N(SO_2C_2F_5)^-$, $^-Al(OC(CF_3)_3)_4$ or $^-BAr_4$ where Ar is a aryl or fluorinated aryl group, or other counterions used in ionic liquids. In one embodiment, the counterion$^-$ is $^-BAr_4$ and Ar is a pentafluorophenyl group. In another embodiment, the electrochromic composition may include a solvent that includes propylene carbonate. While specific solvents have been disclosed as being associated with the electrochromic composition, numerous other solvents that would be known to those having ordinary skill in the art having the present disclosure before them are likewise contemplated for use. For example, in addition to the solvent, the electrochromic medium may be a gel composition.

In some embodiments, the electrochromic device is a switchable electro-optic filter. In some embodiments, the switchable electro-optic filter comprises an electro-optic cell. In some embodiments, the switchable electro-optic filter is a switchable electro-optic infrared filter. In some embodiments the electrochromic device comprises an electro-optic mirror. In some embodiments, the device is an optical imager or filter that blocks a range of wavelengths through a functional zone of the device.

Electrochromic devices described herein may also include, for illustrative purposes only, an architectural window, an aircraft transparency, a mirror, a display device, and the like. It will be understood that like or analogous elements and/or components, and/or methods referred to herein, may be identified throughout the drawings with like reference characters. In some embodiments, the electrochromic device is an electrochromic window or an electrochromic mirror. In some embodiments, the device is a vehicular interior electrochromic mirror. In some embodiments, the device is a variable transmission electrochromic window. In some embodiments, the device is an aircraft window system. Other applications of the electrochromic device includes screens for watches, calculators and computer display screens; eye wear such as eyeglasses and sunglasses; switchable mirrors, sun visors; automobile, architectural, aircraft, marine, and spacecraft windows; information display boards and digital billboards and the like.

The present invention, thus generally described, will be understood more readily by reference to the following examples, which are provided by way of illustration and are not intended to be limiting of the present invention.

EXAMPLES

Example 1

A Near-Infrared (NIR) Isolated Electrode Filter Device

Figure 6:
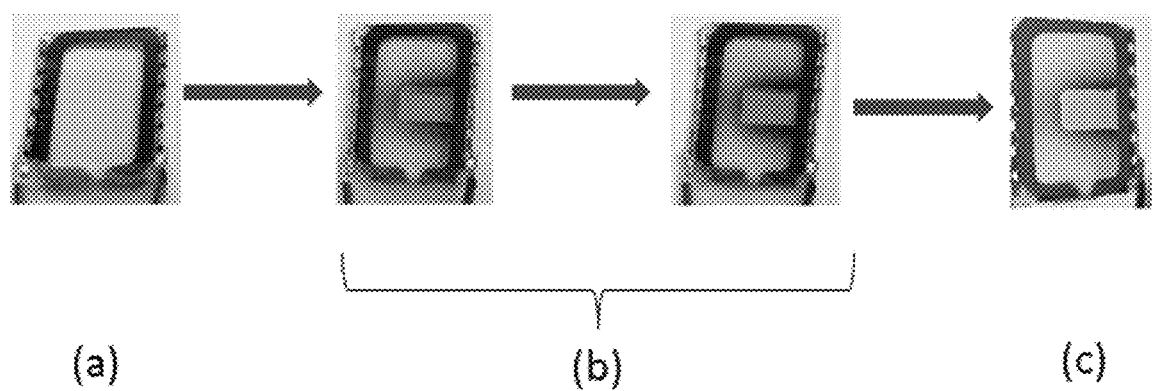
FIG. 6 depicts photographs of the near-infrared isolated electrode filter device of FIG. 5 in the unpowered state (a), powered at 1.4 volt during transition (b), and at the final state (c).
Figure 7:
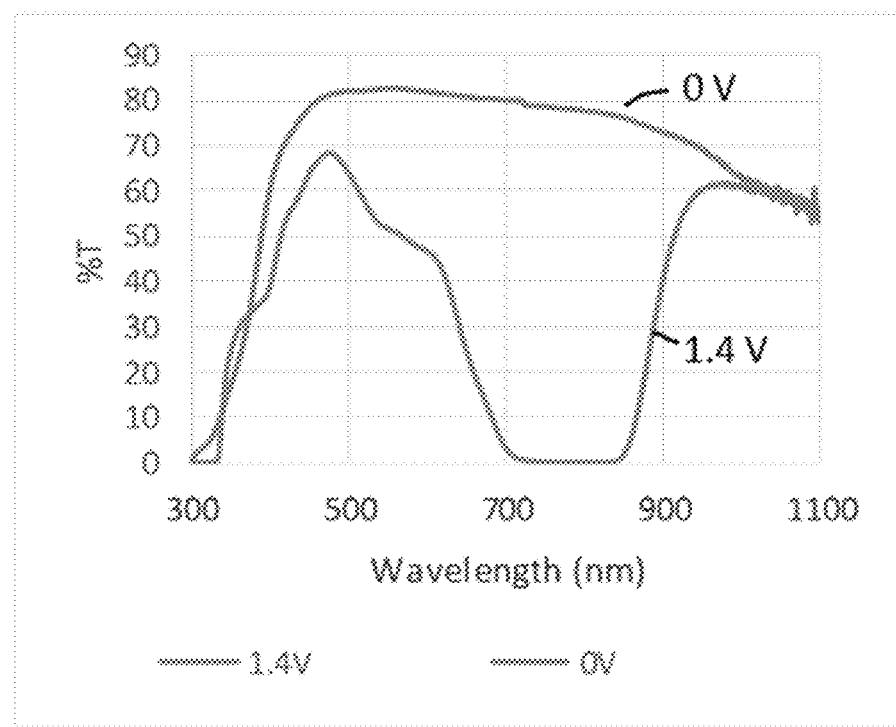
FIG. 7 depicts transmission spectral data for the near-infrared filter device of FIG. 5.
Figure 8:
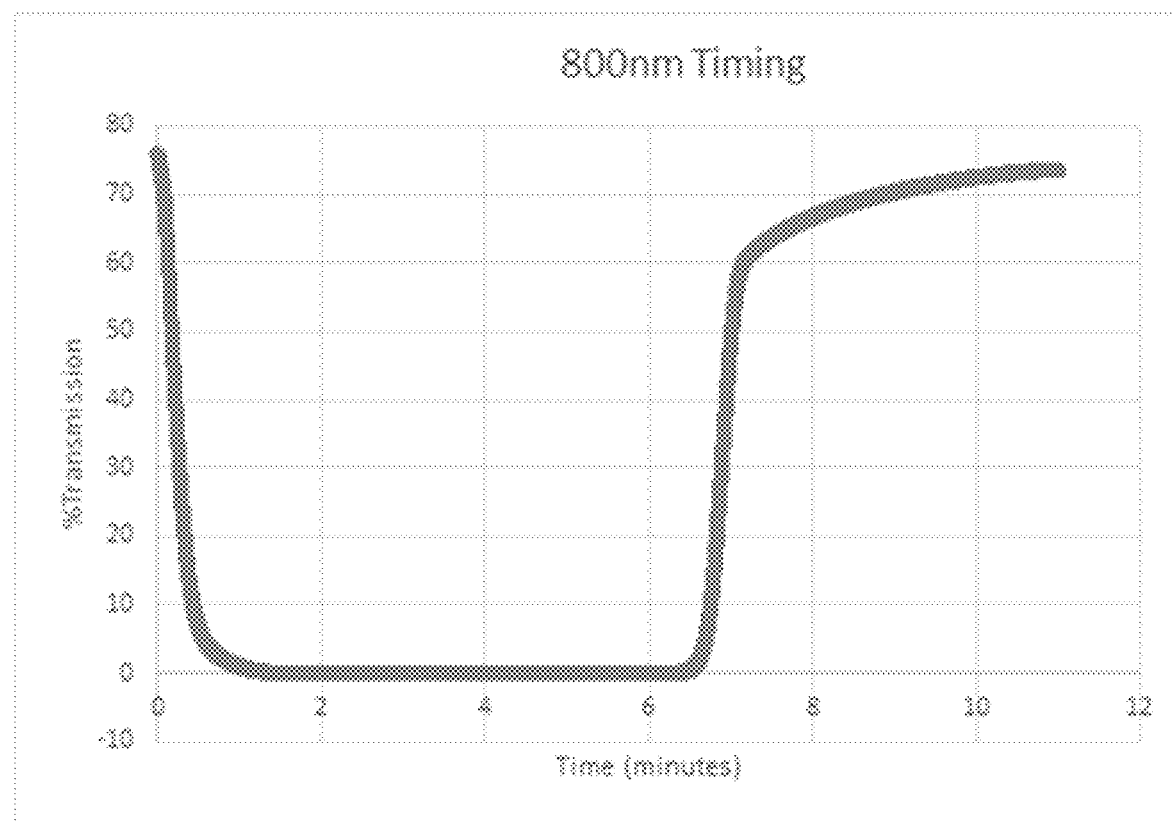
FIG. 8 depicts assessment of switching time by the near-infrared filter device of FIG. 5.

A non-limiting example of a NIR isolated electrode filter device, shown in FIG. 5 and FIG. 6, was filled with a solution of cathodic compound (15 mM of 1,1'-dioctyl-4,4'-bipyridinium bis (tetrafluoroborate)) and NIR absorber anodic compound (7 mM of 3,10-dimethoxy-7,14-(4-triethylammonium butyl) triphenodithiazine bis (tetrafluoroborate)), and $LiBF_4$ electrolyte (100 mM) in propylene carbonate. The device contained ITO-coated glass substrates with laser ablated isolation lines at surface 2 and surface 3, where the two active electrodes do not overlap significantly. Transmission spectral data and assessment of switching time for the device are shown in FIG. 7 and FIG. 8, respectively.

Example 2

A Surface-Confined Electrochromic Filter Device

A surface confined electrochromic filter device is constructed by using an ITO-coated electrode which is coated with a surface-confined cathodic material, such as a crosslinkable cathodic network or cathodic metal oxide, but leaving a region that has no cathodic coating. A non-limiting example of a surface-confined electrochromic network is described in US 20150346573, which is incorporated by reference herein in its entirety. The second ITO-coated electrode is also coated with surface-confined anodic material. The coated electrodes are positioned in a spaced-apart relationship, with the cathodic and anodic coatings facing each other, and epoxy seal was placed around the perimeter and cured to form cell leaving offsets for attachments of electrical contacts. The resulting cell is filled with an electrolyte. See, for example, FIG. 14.

Example 3

An Electrochromic Mirror

An electrochromic mirror is constructed according to the design as shown in FIG. 15. The rear surface of the top substrate is coated with a transparent conductive anode layer (e.g., ITO) and includes a non-active region obtained through, for example, laser ablation. The front surface of the bottom substrate is coated with a continuous metallic reflective cathode conductive layer. The metallic reflective cathode conductive layer may contain chromium, silver, rhodium or any combination thereof. Incident light is transmitted through the electrochromic medium, reflected on the front surface of the bottom substrate, and re-transmitted through the electrochromic medium.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular devices, methods, reagents, compounds, or compositions, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electro-optic device comprising:
   a first substrate having a first surface and a second surface;
   a second substrate having a third surface and a fourth surface;
   a sealing member; and
   an electrochromic medium;
   wherein:
   the second and third surfaces are substantially parallel to one another;
   the sealing member is positioned between the first substrate and second substrate to define a chamber containing the electrochromic medium;
   the second surface and the third surface are proximate to one another;
   the second surface comprises a first conductive layer;
   the third surface comprises a second conductive layer;
   an active cathode region is present in one or more of the first conductive layer and the second conductive layer;
   an active anode region is present in one or more of the first conductive layer and the second conductive layer;
   a non-active region is present in one or more of the first conductive layer and the second conductive layer, the non-active region being unable to reduce or oxidize electroactive material in the electrochromic medium; and
   (1) the active anode region is at least partially not occluded by the active cathode region when the chamber is viewed from any vantage point perpendicular to the second surface; or
   (2) the active cathode region is at least partially not occluded by the active anode region when the chamber is viewed from any vantage point perpendicular to the second surface; and
   the active anode region is at least partially occluded by the non-active region when the chamber is viewed from any vantage point perpendicular to the second surface; or the active cathode region is at least partially occluded by the non-active region when the chamber is viewed from any vantage point perpendicular to the second surface.

2. The electro-optic device of claim 1, wherein the active anode region is at least partially occluded by the non-active region when the chamber is viewed from any vantage point perpendicular to the second surface.

3. The electro-optic device of claim 1, wherein the active cathode region is at least partially occluded by the non-active region when the chamber is viewed from any vantage point perpendicular to the second surface.

4. The electro-optic device of claim 1, wherein a portion of the active cathode region is not occluded by the active anode region when the chamber is viewed from any vantage point perpendicular to the second surface.

5. The electro-optic device of claim 1, wherein a portion of the active anode region is not occluded by the active cathode region when the chamber is viewed from any vantage point perpendicular to the second surface.

6. The electro-optic device of claim 1, wherein the active anode region is not occluded by the active cathode region when the chamber is viewed from any vantage point perpendicular to the second surface.

7. The electro-optic device of claim 1, wherein the device is an optical imager or filter that blocks a range of wavelengths through a functional zone of the device.

8. The electro-optic device of claim 1, wherein the first and second surfaces are substantially parallel to one another.

9. The electro-optic device of claim 1, wherein the third and fourth surfaces are substantially parallel to one another.

* * * * *